United States Patent
Kim et al.

(10) Patent No.: US 6,697,692 B2
(45) Date of Patent: Feb. 24, 2004

(54) CONTROL SYSTEM OF FACTORY AUTOMATION FACILITY FOR SEATBELT RETRACTOR ASSEMBLY AND METHOD THEREOF

(75) Inventors: Taek Kwang Kim, Bucheon (KR); Jun Yong Park, Wonju (KR); Byung Gul Choi, Wonju (KR); Dong Sub Lee, Chuncheon (KR)

(73) Assignee: Delphi Automotive Systems Sungwoo Corporation, Wonju (KR)

( * ) Notice: Subject to any disclaimer, the term of this patent is extended or adjusted under 35 U.S.C. 154(b) by 0 days.

(21) Appl. No.: 10/079,808

(22) Filed: Feb. 22, 2002

(65) Prior Publication Data

US 2002/0124649 A1 Sep. 12, 2002

(30) Foreign Application Priority Data

Feb. 23, 2001 (KR) .......................................... 2001-9169

(51) Int. Cl.$^7$ ........................... G06F 19/00; B60R 21/00
(52) U.S. Cl. ........................ 700/117; 700/122; 297/464
(58) Field of Search ............................. 700/90, 95, 117, 700/122; 280/801.1; 297/464

(56) References Cited

U.S. PATENT DOCUMENTS 6,378,350 B1 * 4/2002 Ito ............................... 72/333
6,419,271 B1 * 7/2002 Yamada et al. ............. 280/806

* cited by examiner

Primary Examiner—Jayprakash N. Gandhi
Assistant Examiner—Ryan A Jarrett
(74) Attorney, Agent, or Firm—Jacobson Holman PLLC

(57) ABSTRACT a control system of a factory automation facility for a seatbelt retractor assembly comprising a factory automation facility and a control portion for controlling the operating of all parts in the factory automation facility, integrally, to enable the mass-production of a seatbelt retractor assembly, in which the factory automation facility comprises a webbing throwing-in portion for throwing-in a webbing of a strip type thereinto by a first webbing supplying portion; first and second webbing position determining devices for guiding the webbing to pass through the hole of a retractor spool, a webbing withdrawing portion including a second webbing supplying portion and a case to withdraw the webbing and store it for a while, first and second part supplying portions for assembling a tongue, a guide ring and a ring mount on the withdrawn webbing, a stopper fixing portion including a third webbing supplying portion for carrying the webbing to a webbing folding portion, upper and lower stopper suppliers for supplying upper and lower to be mounted on both surfaces of the webbing, respectively, and a stopper pressing portions for coupling the upper and lower stopper parts with each other on the other side of the webbing; and a webbing folding portion for folding the front end of the webbing by the reference of its center in a longitudinal direction and coupling the folded end to an end mount, and the control portion perform routines of turning on the power of a system to force the portions of the factory automation facility to be ready for their operating; throwing-in a webbing into a retractor; withdrawing the webbing from the retractor; carrying the webbing to a proper position so as to press upper and lower stoppers on the webbing; pressing the upper and lower stoppers to be arranged on the other side of the webbing; and pressing the upper and lower stoppers to be coupled to each other and folding the front end of the webbing to be coupled with an end mount.

19 Claims, 19 Drawing Sheets

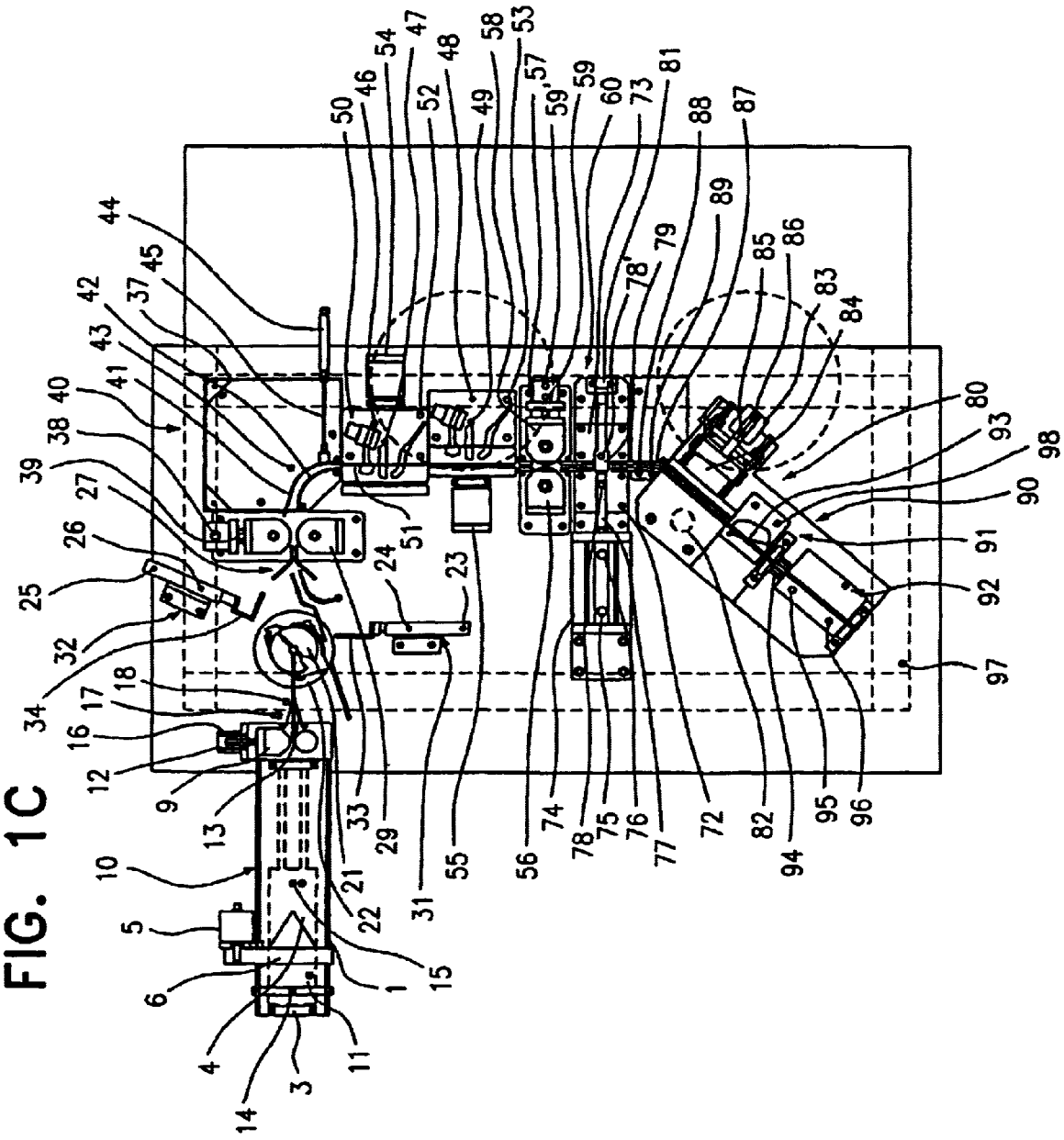

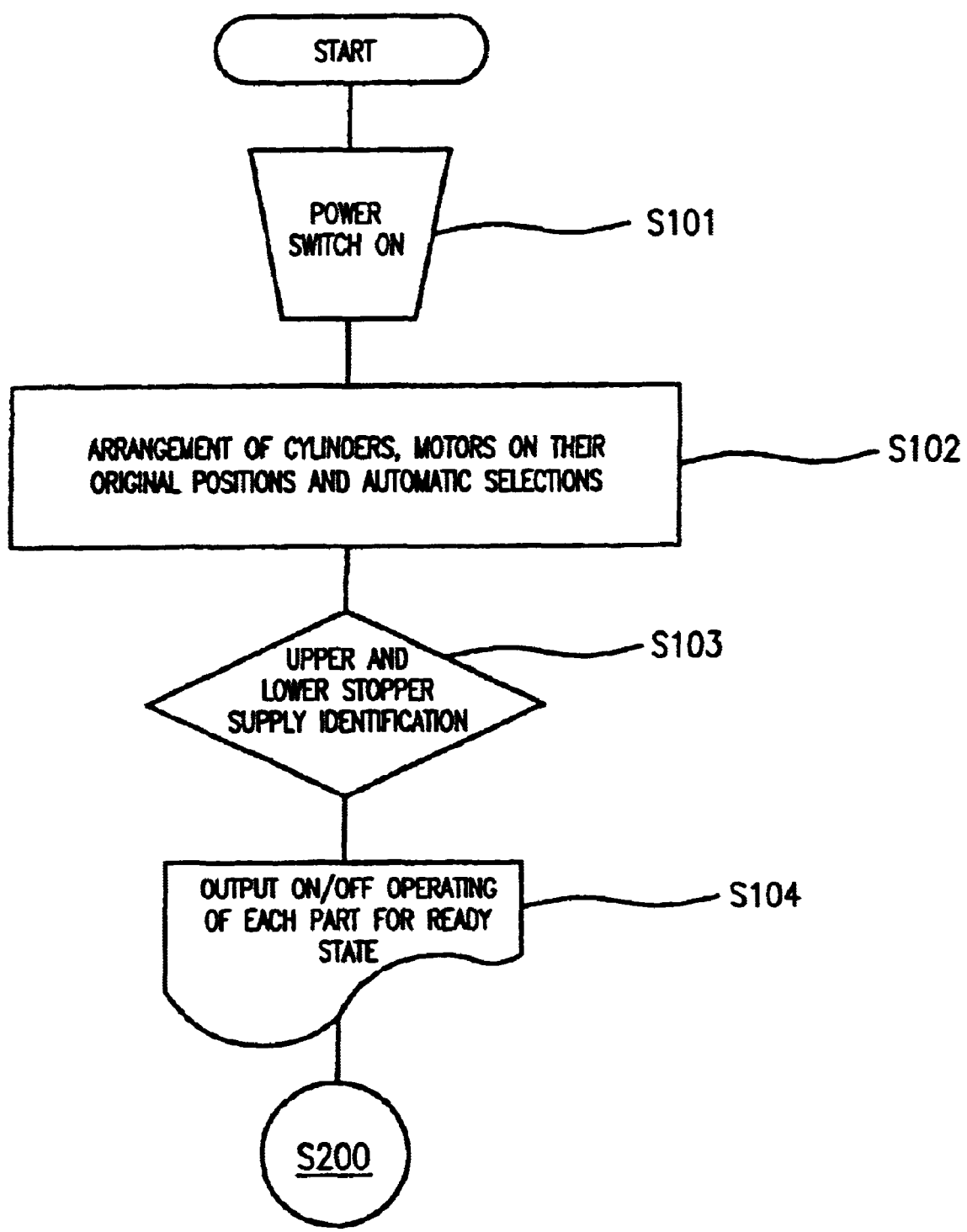

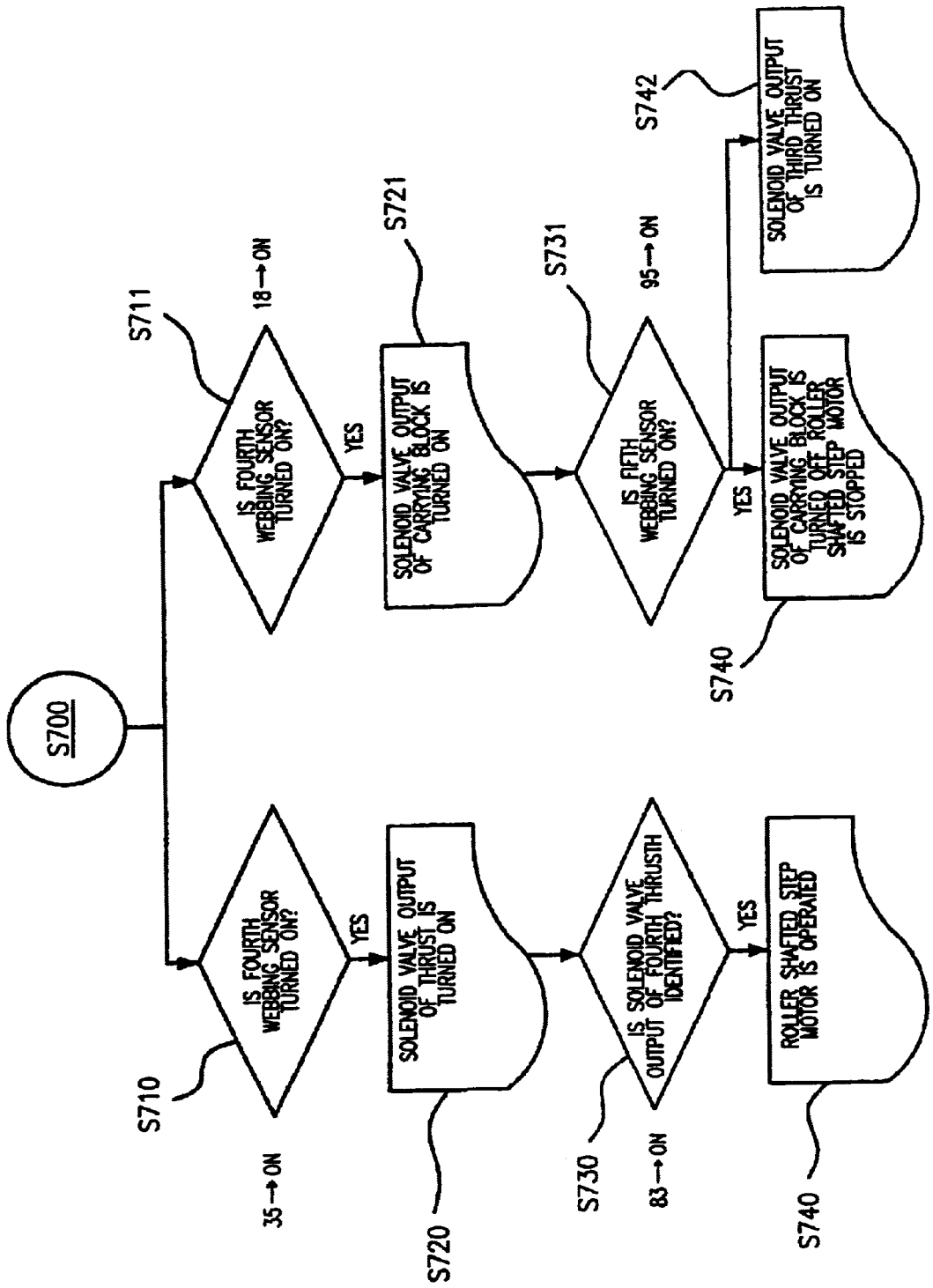

CONTROL SYSTEM OF FACTORY AUTOMATION FACILITY FOR SEATBELT RETRACTOR ASSEMBLY AND METHOD THEREOF

BACKGROUND OF THE INVENTION

The invention is related to providing a factory automation facility for a seatbelt retractor assembly, and particularly, to providing a control system of a factory automation facility for enabling the mass-production of a seatbelt retractor assembly through factory automation procedures using a Programmable Logic Controller (PLC), solenoid valves, sensors, actuator solenoid valves, etc. and a control method thereof.

Prior Arts

In general, the assembly of a seatbelt retractor has depended upon the manual work rather than the use of a factory automation facility, in which the factory automation requires the PLC. The PLC is known as a core of the factory automation, which includes a microprocessor integrated with a relay, a timer, a counter, etc. Such like PLC was firstly represented to replace an old relay control board therewith, which enables the sequence control, the computation of the arithmetics, the logics and the function and the data process. For it, the PLC includes a microprocessor able to store/process the sequence program (memory and CPU), an input/output device, a power supply and its peripheries, another PLC, a communication device for receiving/transferring data and executive software for controlling them. Therefore, in these days, the PLC is adapted to the factory facility through all over the industry mechanism fields, especially used as means rising the competition force in the production and marketing such as an automobile assembly and its part companies.

On the other hand, a field requiring many manual works such as a seatbelt retractor assembly requests a factory automation facility suitable for a kind of its related parts and assembly procedures in respects of the product price reduction and quality control.

The seatbelt retractor is a kind of a safety apparatus including a seatbelt assembly and retractor. The seatbelt retractor assembly includes a webbing of a strip form made of a high tension fiber material, a removable buckle and a retractor fixed to a place of a vehicle frame for protecting a driver or passenger who wears a seatbelt in a vehicle in a manner to fasten the driver to a seat in a accident such as rapid acceleration or deceleration, crashing, etc., thereby preventing a serious wound due to the clashing against the vehicle structure or the escape out of the vehicle. Especially, the webbing includes an end with a metal fixing pin being wrapped around its periphery and other end that an end mount is coupled thereto. Also, the webbing includes a tongue fixed thereto and for being engaged with the buckle, an end mount with an integral bolt for making it fix to the vehicle frame, at least one stopper of a button form pressed on its surface, a ring mount with an integral bolt for making it fix to the vehicle side frame and a guide ring used as an inner finishing material. The webbing assembled with its parts is mounted in the vehicle in a manner to fix its three points.

Catching up with the consistent and exact assembly of the seatbelt retract, the factory automation facility is inevitably required. For it, the seatbelt retractor assembly requires a factory automation facility for improving a complicated assembly process of assembling the webbing into a reel under the elastic force, inserting a plurality of parts into/on the webbing in advance, forcing the webbing to be maintained at the assembled state with its parts, etc.

Accordingly, an object of the invention is to provide a control system of a factory automation facility for enabling mass-production a seatbelt retractor assembly through a PLC operation and a control method thereof.

Another object of the invention is to provide a control system including a factory automation facility and a control portion that a PLC is based on for enabling mass-production a seatbelt retractor assembly, easily and economically and a control method thereof.

SUMMARY OF THE INVENTION

According to the invention, a control system of a factory automation facility for a seatbelt retractor assembly comprises a factory automation facility and a control portion for controlling the operating of all parts in the factory automation facility, integrally, to enable the mass-production of a seatbelt retractor assembly, in which the factory automation facility comprises a webbing throwing-in portion for throwing-in a webbing of a strip type thereinto by a first webbing supplying portion; first and second webbing position determining devices for guiding the webbing to pass through the hole of a retractor spool, a webbing withdrawing portion including a second webbing supplying portion and a case to withdraw the webbing and store it for a while, first and second part supplying portions for assembling a tongue, a guide ring and a ring mount on the withdrawn webbing, a stopper fixing portion including a third webbing supplying portion for carrying the webbing to a webbing folding portion, upper and lower stopper suppliers for supplying upper and lower to be mounted on both surfaces of the webbing, respectively, and a stopper pressing portions for coupling the upper and lower stopper parts with each other on the other side of the webbing; and a webbing folding portion for folding the front end of the webbing by the reference of its centre in a longitudinal direction and coupling the folded end to an end mount, and the control portion includes an inputting portion for processing signals from various sensors properly arranged on the factory automation facility, a power source supply for supplying at least one different power sources to a PLC, the PLC for controlling the operating of all portions in the factory automation facility, integrally, first and second microprocessor circuits connected through an interface to the PLC for controlling the operating of various parts in the factory automation facility and an outputting portion for applying control signals from the PLC to a load driving portion including rotating motors, stepping motors, a folding motor, various flexible cylinders using a hydraulic pressure, various solenoid valves and various lamps.

Also, a control method of a factory automation facility for a seatbelt retractor assembly comprises routines of turning on the power of a system to force the portions of the factory automation facility to be ready for their operating; throwing-in a webbing into a retractor; withdrawing the webbing from the retractor; carrying the webbing to a proper position so as to press upper and lower stoppers on the webbing; pressing the upper and lower stoppers to be arranged on the other side of the webbing; and pressing the upper and lower stoppers to be coupled to each other and folding the front end of the webbing to be coupled with an end mount.

BRIEF DESCRIPTION OF THE DRAWINGS

The invention will be described in detail with reference to the accompanying drawings, in which:

FIG. 1C is a plan view illustrating the arrangement states of sensors mounted on the factory automation facility for the seatbelt retractor assembly as shown in FIG. 1A;

FIG. 5 is a flow chart illustrating a control method of a factory automation facility for a seatbelt retractor assembly according to the invention;

FIG. 11A is a flow chart illustrating a folding routine of FIG. 4; and

DETAILED DESCRIPTION OF THE INVENTION

Figure 1A:
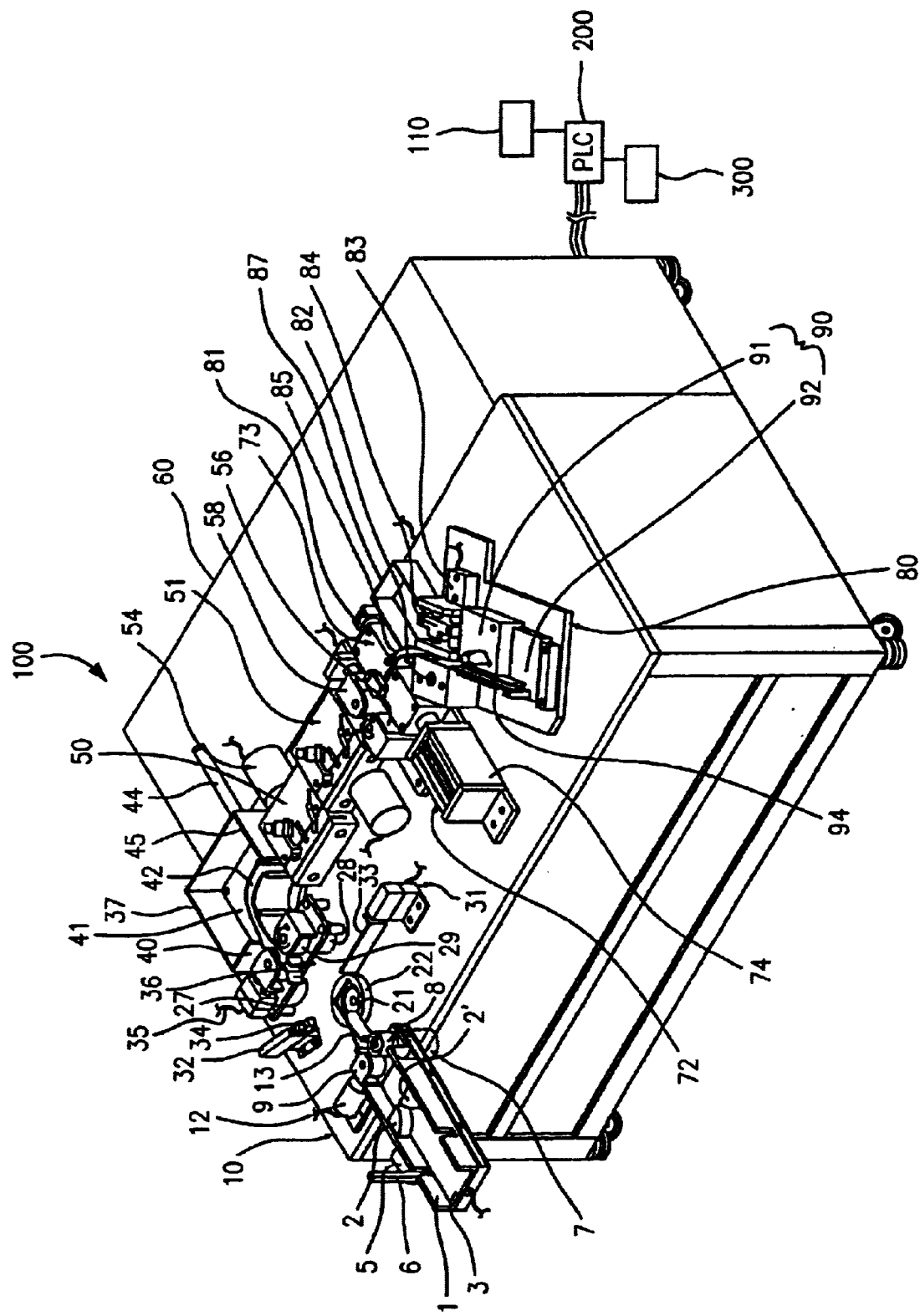
FIG. 1A is a perspective view illustrating schematically the configuration of a factory automation facility for a seatbelt retractor assembly which adapts a control system according to the invention.
Figure 1B:
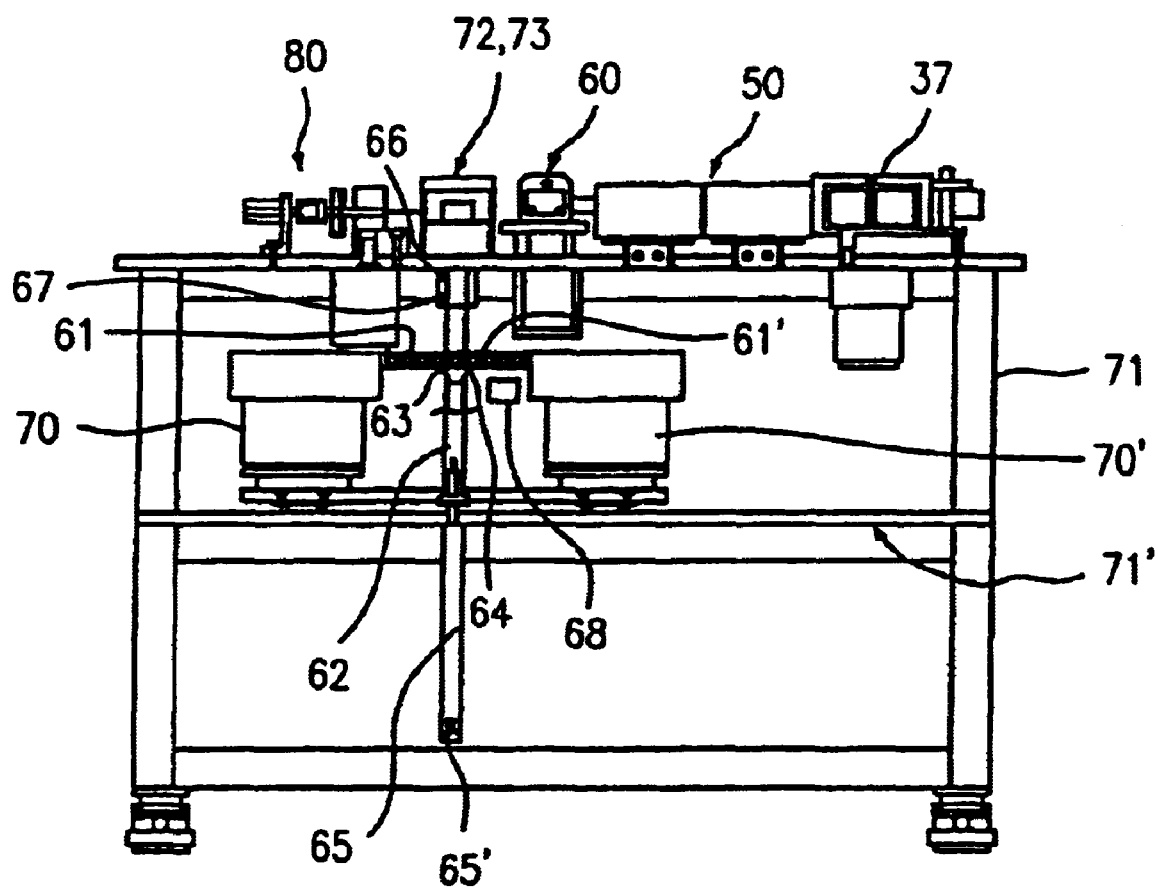
FIG. 1B is a side view illustrating the coupling relationship of a part alignment supplier mounted in the factory automation facility for the seatbelt retractor assembly as shown in FIG. 1A.

Referring to the drawings, FIGS. 1A, 1B and 1C schematically show the configuration of a factory automation facility for a seatbelt retractor assembly that adapts a control system according to the invention.

According to the invention, a control system comprises a factory automation facility 100 and a control portion 200 for controlling the operating of the factory automation facility 100 to enable the mass-production of a seatbelt retractor assembly.

The factory automation facility 100 comprises a webbing throwing portion 10 for throwing a webbing of a strip type thereinto by a first webbing supplying portion, first and second webbing position determining devices 31 and 32 for guiding the webbing to pass through the hole of a retractor spool, a webbing withdrawing portion 40 including a second webbing supplying portion and a case 37 to withdraw the webbing and store it for a while, first and second part supplying portions 50 and 51 for assembling a tongue, a guide ring and a ring mount on the withdrawn webbing, a stopper fixing portion 60 including a third webbing supplying portion for carrying the webbing to a webbing folding portion, stopper suppliers 70 and 70' for supplying upper and lower or top and bottom stoppers to be mounted on the upper and lower surfaces of the webbing, respectively, and a stopper pressing portions 72 and 73 for coupling the upper and lower stopper parts with each other on the other side of the webbing; and a webbing folding portion 80 for folding the front end of the webbing by the reference of its centre in a longitudinal direction and coupling the folded end to an end mount. The control portion 200 controls the operating of all portions constituted as the factory automation facility, integrally.

In addition to the factory automation facility 100 and the control portion 200, the control system comprises a hydraulic device 110 and an outer power source 300 to enable the execution of a series of procedures for assembling a seatbelt retractor assembly to be suitable for an optimum automation work in harmony with several manual. In other words, the factory automation facility 100 automatically performs a series of procedures for assembling the webbing, the seatbelt retractor and a plurality of parts on the webbing except for three manual works, placing the front end of the webbing on the webbing throwing portion 10, providing the tongue, the guide ring guide and the ring mount on the first and second part supplying portions 50 and 51 and providing the end mount on the webbing folding portion 80. Of course, the manual works can be authorized, but it is likely advantageous that the invention does not adapt their automation considering a cost or the automation and very simple works of an operator.

The detailed configuration of the factory automation facility 100 is as follows: a webbing throwing portion 10 comprises a case 1 in which triangle blocks 2 and 2' are mounted to form a clearance there between for guiding/supporting the webbing at an upstanding state. An actuator 3 and a cylinder 4 are mounted on the lower portion of the case 1 to move the case 10 with the webbing 11 in a longitudinal direction. A step motor 5 and a rotating bar 6 shafted thereto are mounted on one side of the case 10 to rotate the rotating bar 6 by a 90° in order to lay down a webbing 11, horizontally, and prevent its twisting to be supplied. A first webbing supplying portion including a step motor 7 and a first roller 8 shafted thereto and a second roller 9 connected to a first thrust 12 facing against each another are mounted on the front end of the case 10. A first guide 13 including two guide plates in the form of a venturi is mounted adjacent the rollers 8 and 9 of the webbing supplying portion and a retractor fixing portion 22 is formed on the rear end of the first guide 13 to position a retractor 21 thereon and direct a hole formed on its spool or reel to the first guide 13.

On the other hand, the cylinder 4 is provided with sensors 14 and 15 to detect its forward and rearward movement, the first thrust 12 is provided with a sensor 16 to detect its forward and rearward movement, the first webbing guide 13 is provide with a sensor 17 being mounted on its entrance to detect a metal fixing pin coupled with the end portion of the webbing 11 and a webbing sensor 18 to detect the webbing withdrawal adjacent thereto.

Therefore, in the webbing-throwing portion 10, the webbing 11 is inserted between the blocks 2 and 2' with being elected. When the front end of the webbing is placed adjacent to the sensor 17, the system is turned on for it's operating. The solenoid valve 12 is operated to advance the second roller 9 and then stop it at the position of the advancement-identifying sensor 13. At that time, the actuator 3 is operated to move the cylinder 4 forward and insert the exit end of the webbing guide 13 into the hole of the retractor spool. Then, the motor 7 rotate the first roller 8 with the second roller 9 to pass the front end of the webbing 11 through the retractor 11.

Thereafter, the webbing 11 is supplied to first and second webbing position determining devices 31 and 32 constituted as a hydraulic cylinder mounted adjacent to the retractor fixing portion 22. The first webbing position determining device 31 includes a metal holder 33 fixed to a piston therein and initial and advancement position sensors 23 and 24 for determining the position movement of its piston to restrict the rotation of the retractor 21 and help guiding the webbing 11 into the hole of the spool. The second webbing position determining device 32 includes a metal holder 34 fixed to a piston therein and initial and advancement position sensors 25 and 26 for determining the position movement of its piston in order to prevent the rotation of the retractor 21 by the movement of the metal holder 34, withdraw the webbing 11 from the spool hole of the retractor 21 and supply it to a webbing withdrawing portion 40. For example, the first and second webbing position determining devices 31 and 32 guide the webbing 11 withdrawn from the retractor 21 and introduce the webbing 11 into the webbing withdrawing portion 40. Then, the webbing 11 is continuously supplied to the webbing-withdrawing portion 40. When the metal sensor 17 detects the metal ring coupled with the other end of the webbing 11, the webbing supplying portion 10 returns to the original operating ready state.

The webbing withdrawing portion 40 comprises a second webbing supplying portion including a second webbing guide 27 that two guide plates are formed like a venturi, a third roller 29 shafted to a step motor 28 and a fourth roller 36 connected to a second solenoid valve 35 to be moved forward and rearward facing to the third roller 29; and a case 37 mounted adjacent to the second webbing supplying portion to store the webbing 11 therein for a while. The second solenoid valve 35 is provided with initial and advancement position sensors 38 and 39. The case 37 includes an opening/closing door 41 hinged at one end adjacent to the rear portion of the second webbing supplying portion and curved at one corner thereof and a supporting plate 42 mounted in parallel to the opening/closing door 41 and spaced away therefrom, so that the webbing 11 is guided therebetween and carried to a first part supplying portion 50. The door 43 includes an opening/closing sensor 43 mounted on the rear surface thereof. A cylinder 44 mounted on the case 35 includes a rod 45 fixed at one end to the rear surface of the door 43 to open/close the door 41.

Therefore, the webbing 11 supplied into the second webbing guide 27 is inserted between the third roller 29 and the fourth roller 36 that are moved forward and rearward by the second solenoid valve 35 and then passes through the passage formed between the supporting plate by the operating of the step motor 28 and the first and second part supplying portions 50 and 51 and supplied to the second supplying portion. At that time, the further advancement of the webbing 11 is temporally stopped and returns to the original state.

The first and second part supplying portions 50 and 51 are a block which includes two slits or guide grooves passing through the webbing 11 and receiving portions formed by the reference of the guide groove to receive a guide ring, a ring mount and a tongue, respectively, so that the webbing 11 is moved through the guide groove and the coupling hole of the parts. The first and second part supplying portions 50 and 51 each includes first forward and backward sensors 45 and 47 and second forward and backward sensors 48 and 49 and first and second tongue sensors 52 and 53 for detecting the inserting of a tongue into the receiving groove. First and second hydraulic cylinders 54 and 55 are respectively coupled to the first and second part supplying portions 50 and 51 to be moved forward and backward according to the position detecting of the sensors and the insertion of the parts.

A stopper fixing portion 60 as shown in FIG. 1B is mounted between a webbing folding portion 80 and a first part supplying portion 50, which comprises a third webbing supplying portion including a fifth roller 56 shafted to a step motor (not shown) to carry the webbing 11 passed through the first part supplying portion 50 to next stage and a sixth roller 58 connected to a third solenoid valve 57 to be moved forward and backward facing to the fifth roller 56; first and second pressing portions 72 and 73 for coupling upper and lower stoppers to be positioned on the other side of the webbing 11 to each other and fixing them to the webbing 11 and stopper suppliers 70 and 70' for arranging the upper and lower stoppers and automatically supplying them to a stopper fixing portion 60, in which the third solenoid valve 57 includes sensors 59 and 59' for detecting the forward and backward movement thereof.

The stopper suppliers 70 and 70' are a known device, which are put on a shelf 71' of a housing 71 to arrange the upper and lower stoppers in an upstanding state and carry them to an elevator 62 using two hydraulic cylinders 65. The elevator 62 includes an elevating bar (not shown) coupled to the piston of a cylinder 62 to elevate the upper and lower stoppers and supply them to the stopper-fixing portion 60. In order to control the operating of the hydraulic cylinder 65, upper and lower stopper sensors 63 and 64 are respectively mounted adjacent to passages 61 and 62 and an initial position sensor 65' is mounted on the lower of the cylinder 65. In order to control the operating of the stopper fixing portion 60 sensors 66 and 67 to detect the forward and backward movement of the elevating bar are mounted adjacent to the upper of the elevator 62 below the stopper-fixing portion 60. And, a vacuum absorber 68 is mounted on pressing portions 72 and 73 to form the backpressure therein.

The stopper-fixing portion 60 further includes the first and second pressing portions 72 and 73 against each other to permit the webbing 11 to be passed therebetween. The first pressing portion 72 includes an actuator 74 for enabling a pressing tool (not shown) fixed to the end of a piston to be expanded and contracted, forward and backward movement sensors 75 and 76 for the operating control of the actuator 74 and a first absorbing portion 77 for forming the inner portion thereof at a vacuum state by the vacuum absorber 68 to position the upper stopper therein and provided with a sensor 78 to identify the fixing of the upper stopper. The second pressing portion 73 includes a second absorbing portion 79 for forming the inner portion thereof at a vacuum state by the vacuum absorber 68 to position the lower stopper therein and provided with a sensor 78' to identify the fixing of the lower stopper and a pushing cylinder 81 moved forward and backward to push the lower stopper into the absorbing portion 79. And the stopper-fixing portion 60 is connected to a webbing-folding portion 80 through a carrying guide 87 guiding the webbing 11. The carrying guide 87 includes a pair of third webbing sensors 88 and 89 mounted to detect the exact position of the upper and lower stoppers on the webbing 11.

Therefore, the upper and lower stoppers are respectively arranged in the stopper supplying portions 59 and 59', supplied to the C characterized passages 61 and 61' at an upstanding state and moved to the elevator 62 connected to two hydraulic cylinder 61. Thereafter, the upper and lower stoppers are respectively adhered to the absorbing portions 77 and 79 with being positioned to face to each other on the other side of the webbing 11.

The webbing folding portion 80 comprises a fourth webbing supplying portion including a seventh roller 82 shafted to a step motor (not shown) to carry the webbing 11 passed through the stopper fixing portion 60 to next stage in order to couple an anchor to the webbing 11, a last part to be assembled, and an eighth roller 84 connected to a fourth thrust 83 to be moved forward and backward facing to the seventh roller 82; and a fixing unit 90 for folding the end portion of the webbing to be inserted into the relative smaller hole of the anchor. The fixing unit 90 includes a folding block 91 forming a curving groove 93 adjacent to the fourth webbing supplying portion to fold both sides of the webbing 11, longitudinally, at the end thereof with being corresponded to the centre line and guide it to be advanced and a carrying block 92 for inserting the folded end of the webbing 11 into the coupling hole of the anchor from the folding block 91. A guide bar 94 is arranged in a straight line between the folding block 91 and the carrying block 92, in which a webbing guide groove is formed. The fourth thrust 83 includes sensors 85 and 86 mounted to detect the forward and backward movement thereof, and the folding block 91 includes a fourth webbing sensor 95 to detect the folded webbing end to be passed therethough. The carrying block 92 includes a hydraulic cylinder mounted on the lower surface thereof to be moved along the guide bar 94, forward and backward movement sensors 95 and 96 for detecting the movement of the cylinder, an anchor sensor 96 for identifying the coupling of the anchor to the webbing 11 and a fourth sensor 97 for detecting the withdrawal of the webbing end.

Figure 2:
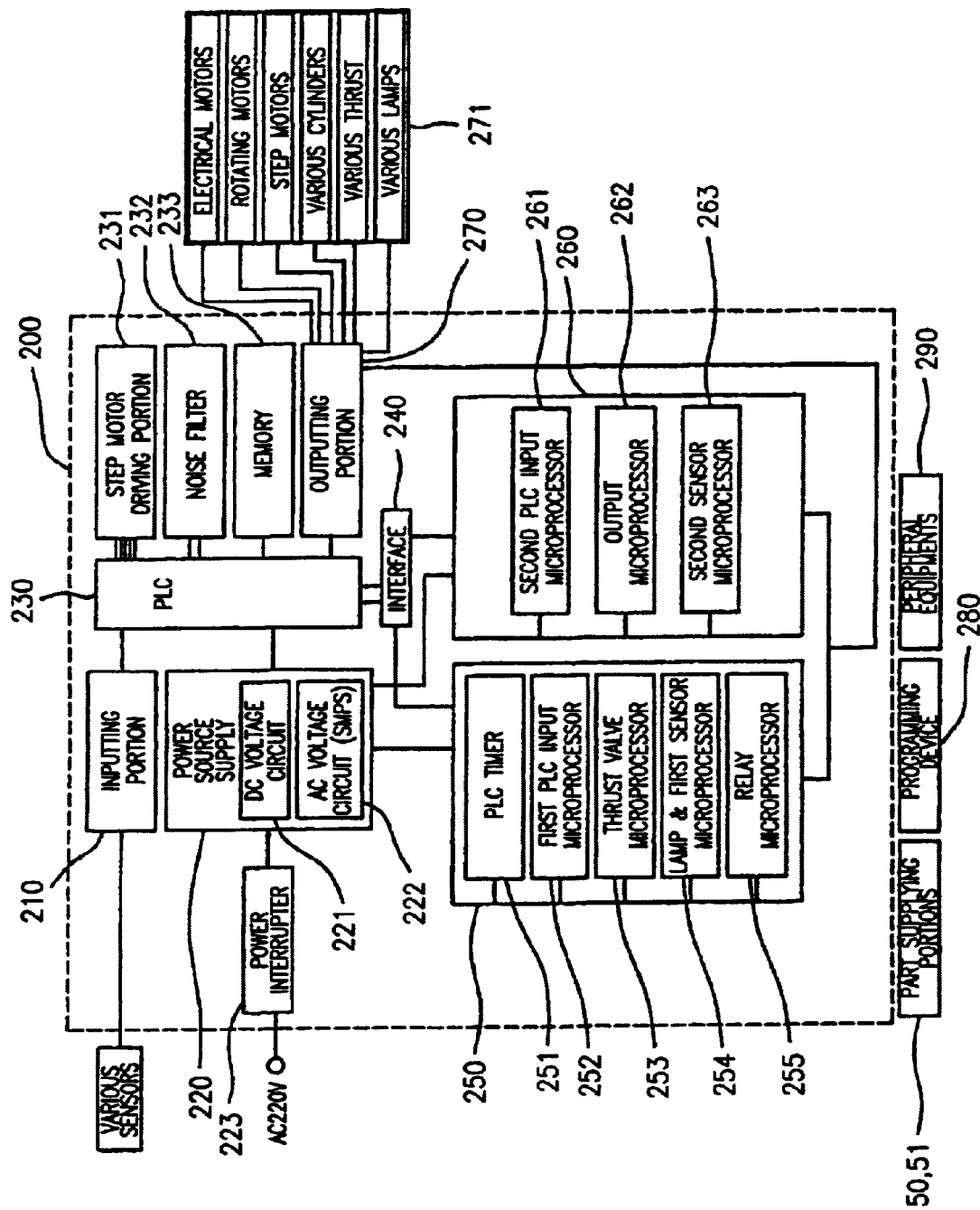
FIG. 2 is a block diagram illustrating a control system of a factory automation facility for a seatbelt retractor assembly according to the invention.

The operation of the factory automation facility 100 will be described in detail with a control portion 200 as follows:

As shown in FIG. 2, the control portion 200 comprises an inputting portion 210 for processing signals from various sensors properly arranged on the factory automation facility 100 as shown in FIG. 1, a power source supply 220 for supplying at least one different power sources to a PLC 230, the PLC 230 for controlling the operating of all portions in the factory automation facility 100, integrally, first and second microprocessor circuits 250 and 260 connected through an interface 240 to the PLC 230 for controlling the operating of various parts in the factory automation facility 100 and an outputting portion 270 for applying control signals from the PLC 230 to a load driving portion 271 including rotating motors, stepping motors, a folding motor, various flexible cylinders using a hydraulic pressure, various solenoid valves and various lamps.

The inputting portion 210 includes a signal converting circuit, a noise removing circuit or squelching circuit and an isolating circuit for preventing the interference between the sensor signal and the control signal of the PLC and for converting various inputting signal fro the sensors into signals processed by the PLC 230, which is a well-known technology in this field.

The outputting portion 270 acts to transfer command signals from the PLC 230 and first and second microprocessor circuits 250 and 260 to the load portions 271 or objects such as the rotating motors, the stepping motors, the folding motor, the cylinders, the solenoid valves and the lamps according to the programming for assembling the seatbelt retractor, which is also a well-known technology in this field.

Herein, it is noted that the inputting and outputting portions 210 and 270 can process analogue inputting signals DC 4 mA~20 mA, antilog outputting signals DC 4 mA~20 mA, an inputting signal from resistor for measuring the temperature, inputting signals from thermostats, signals TTL, DC 24V SINK, DE 24 V SOURCE from digital inputting devices, AC 110V and AC 220V from analogue inputting devices and signals from digital or analogue outputting devices, RELAY, TRANSISTOR, SSR, etc., which are not limited thereto.

The power source supply 220 is electrically connected through a power interrupter 223 to AC 220V terminal and includes an electronic contacting circuit or DC voltage circuit 221 for generating various DC voltages and AC voltage circuit 222 for generating AC voltages to supply different corresponding power voltages to the PLC 230 and other portions, which is a chassis interior or exterior type and a separate unit type.

The PLC 230 includes a step motor driving portion 231, a noise filter 232, a memory 233 provided with a ROM for storing a system program for assembling a seatbelt retractor therein and the first and second microprocessor circuits 250 and 260, to which are electrically connected.

The first microprocessor circuit 250 includes a PLC timer for storing a plurality of delay times and part operating timings in a data register thereof and generating the conditional signals for the control based on the operating sequence of the system, a first PLC input microprocessor 252 for processing the control signals from the PLC 230, a solenoid valve microprocessor 253 for controlling the operating of a plurality of solenoid valves, a lamp and first sensor microprocessor 254 for controlling the operating of a plurality of lamps and processing the signal from a first sensor and a relay microprocessor 255 for controlling the operating of a plurality of relays in order to perform the control algorithms as described below. The second microprocessor circuit 260 includes a second PLC input microprocessor 261 for processing the input signals from the PLC 230, an output microprocessor 262 for controlling the operating of the outputting portion 233 and a second sensor microprocessor 263 for processing the signals from the second sensor in order to perform the control algorithms along with the first microprocessor circuit 250 as described below.

Figure 3:
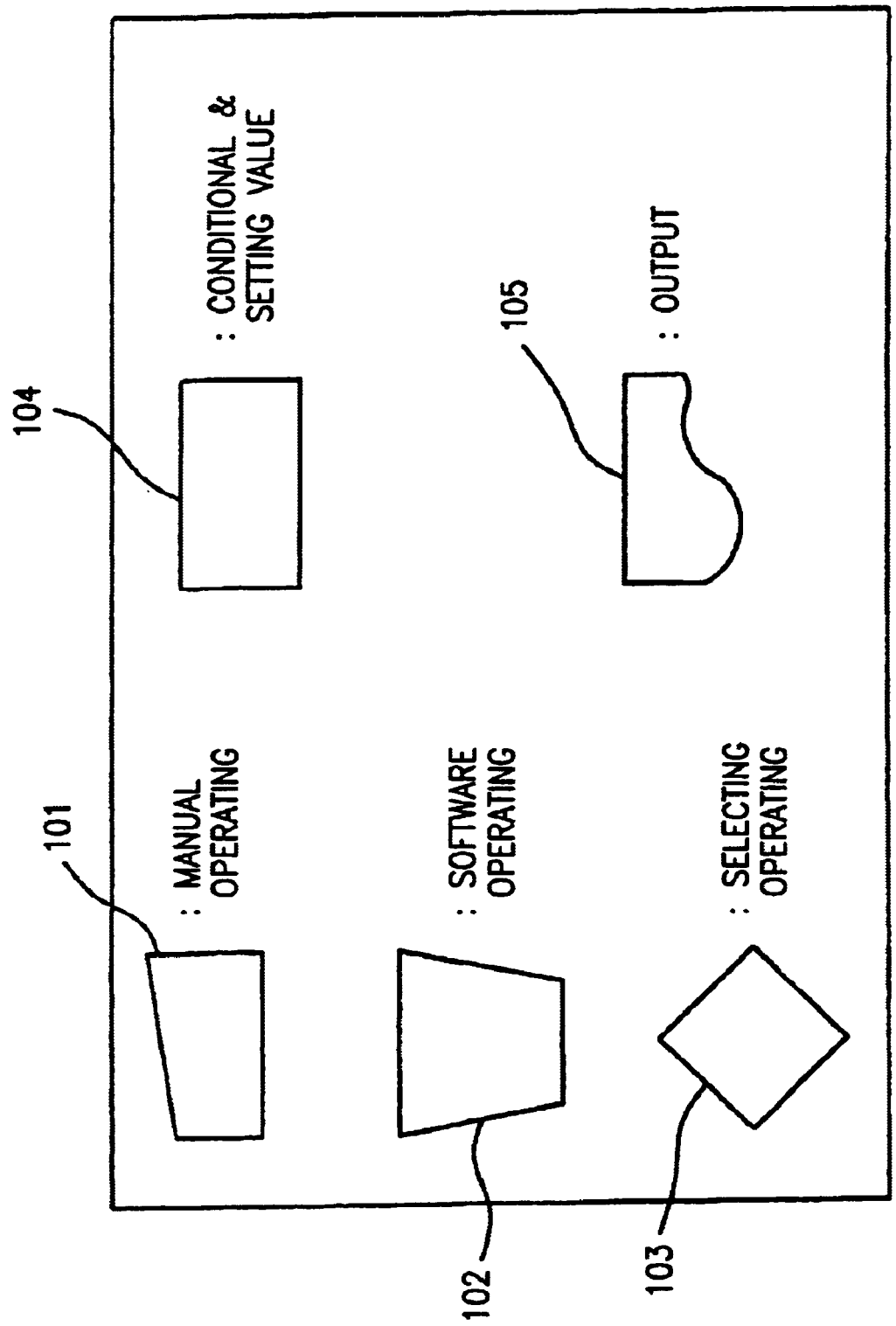
FIG. 3 is a block diagram illustrating the operation of a control system according to the invention.

The control portion 200 also can include a remote input/output portion, a data highway, a LAN interface and a computer interface in order to communicate with another PLC. As shown in the drawing, the control portion 200 further includes a programming device 280 such as Hand Held Terminal, Exclusive Terminal, Personal Computer Terminal, etc. for inputting/correcting/mending a PLC control logic and a peripheral equipments such as ROM writer, Tape recorder, Disk drive, and Printer, etc. Therefore, the control portion 200 controls the operating of all portions in the factory automation facility 100 for the seatbelt retractor assembly, integrally, as follows:

As shown in FIG. 3, explaining boxes as indicated in a flow chart illustrating a control method of a PLC, a box 101 having a slanted upper means the manual operating, a reverse trapezium box 102 means the algorithm operating, a lozenge-shaped box 103 means the selection of Yes and No, a rectangular box 104 means a condition and a setting value (or basic value) and a box 105 having a wave-shaped lower means the output.

Figure 4:
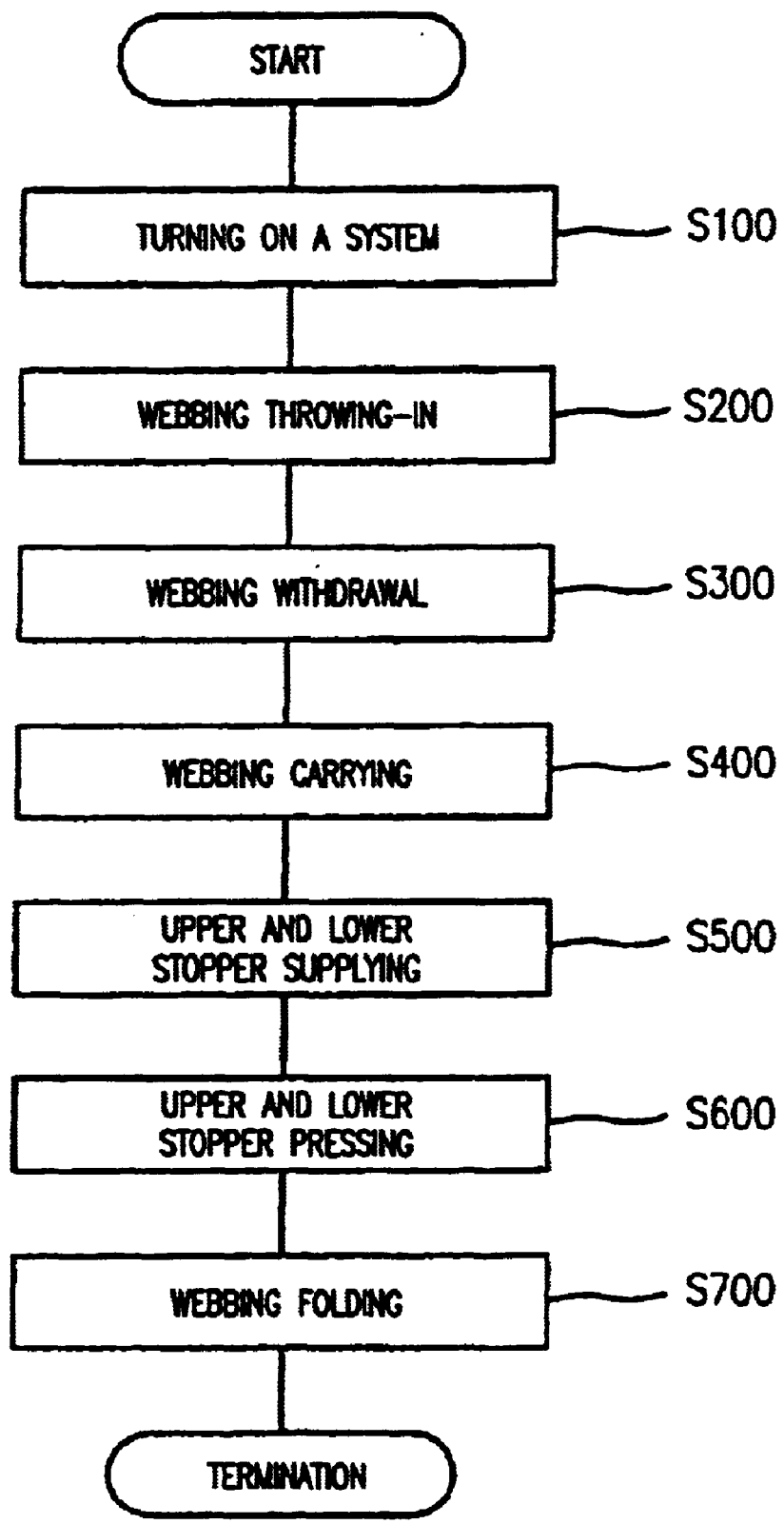
FIG. 4 is a flow chart illustrating a schematic control method of a factory automation facility for a seatbelt retractor assembly according to the invention.

As shown in FIG. 4, a control method for controlling the operating of all portion in a factory automation facility 100 comprises routines of turning on the power of a system to force the portions of the factory automation facility 100 to be ready for their operating at a system-on routine S100, throwing a webbing into a retractor at a webbing throwing-in routine S200, withdrawing the webbing from the retractor at a webbing withdrawing routine S300, carrying the webbing to a proper position so as to press upper and lower stoppers on the webbing at routine S400, supplying the upper and lower stoppers to be arranged on the other side of the webbing at a stopper supplying routine S500, pressing the upper and lower stoppers to be coupled to each other at a stopper fixing routine S600 and folding the front end of the webbing to be coupled with an end mount at a folding routine 700.

As shown in FIG. 5, the system-on routine S100 comprises system initial steps. At step S101, the power switch is turned on to operate the factory automation facility 100 for the seatbelt retractor assembly. Step S101 proceeds onto step S102 to arrange on the original position of cylinders, solenoid valves, motors, lamps by the PLC control and set the basic values of the parts for assembling the seatbelt retractor, again, by a user. At that time, it is judged at step S103 whether sensors 78 and 78' detect the supplying of upper and lower stoppers to the positions for a pressing procedure. Step S103 goes to step S104 to perform the output on/off operating of each element representing the good condition of the portions to be controlled for a ready state prior to the assembly operating. Thereafter, the webbing throwing-in routine S200 starts.

Figure 6A:
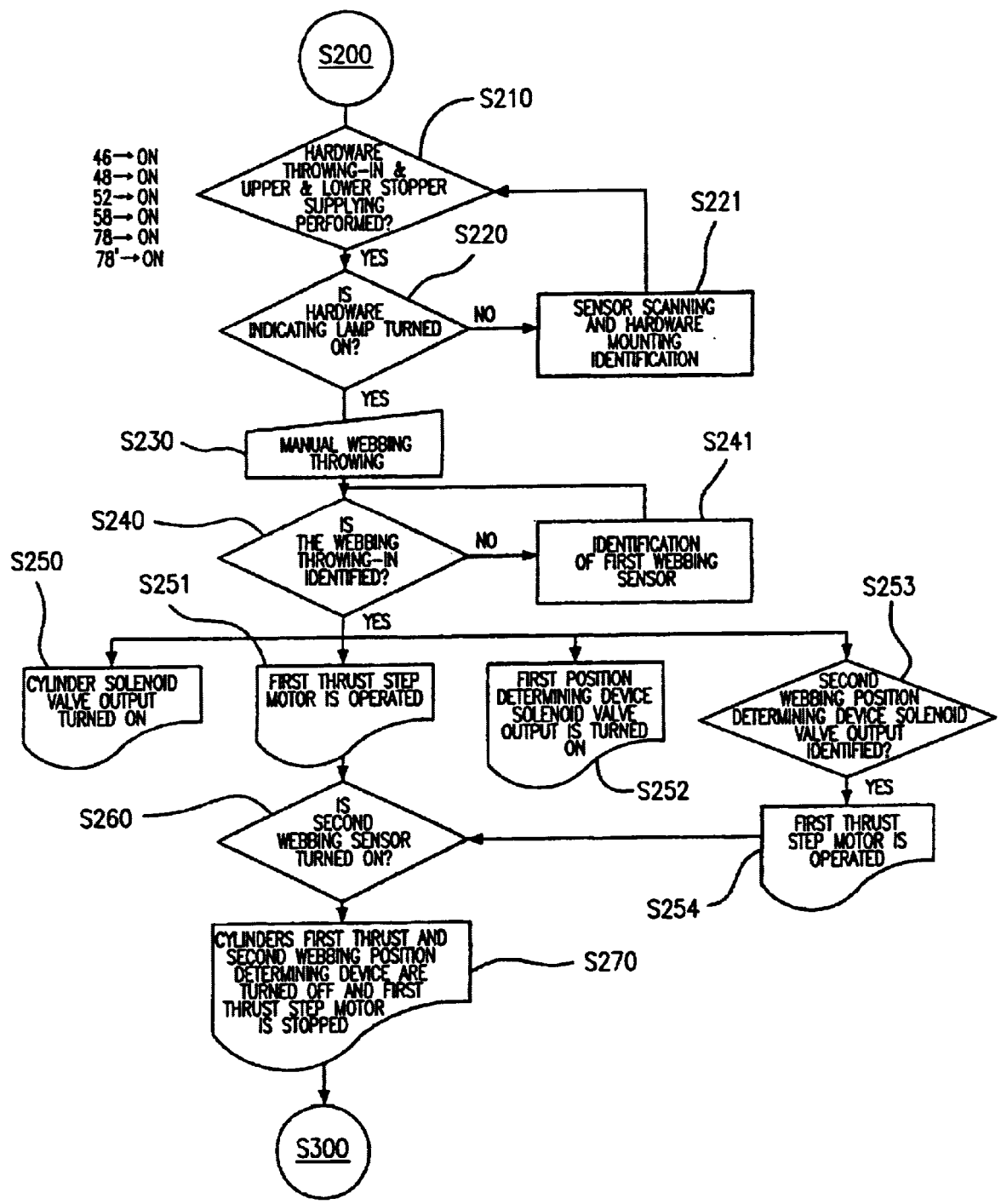
FIG. 6A is a flow chart illustrating a system-on routine of FIG. 4.
Figure 6B:
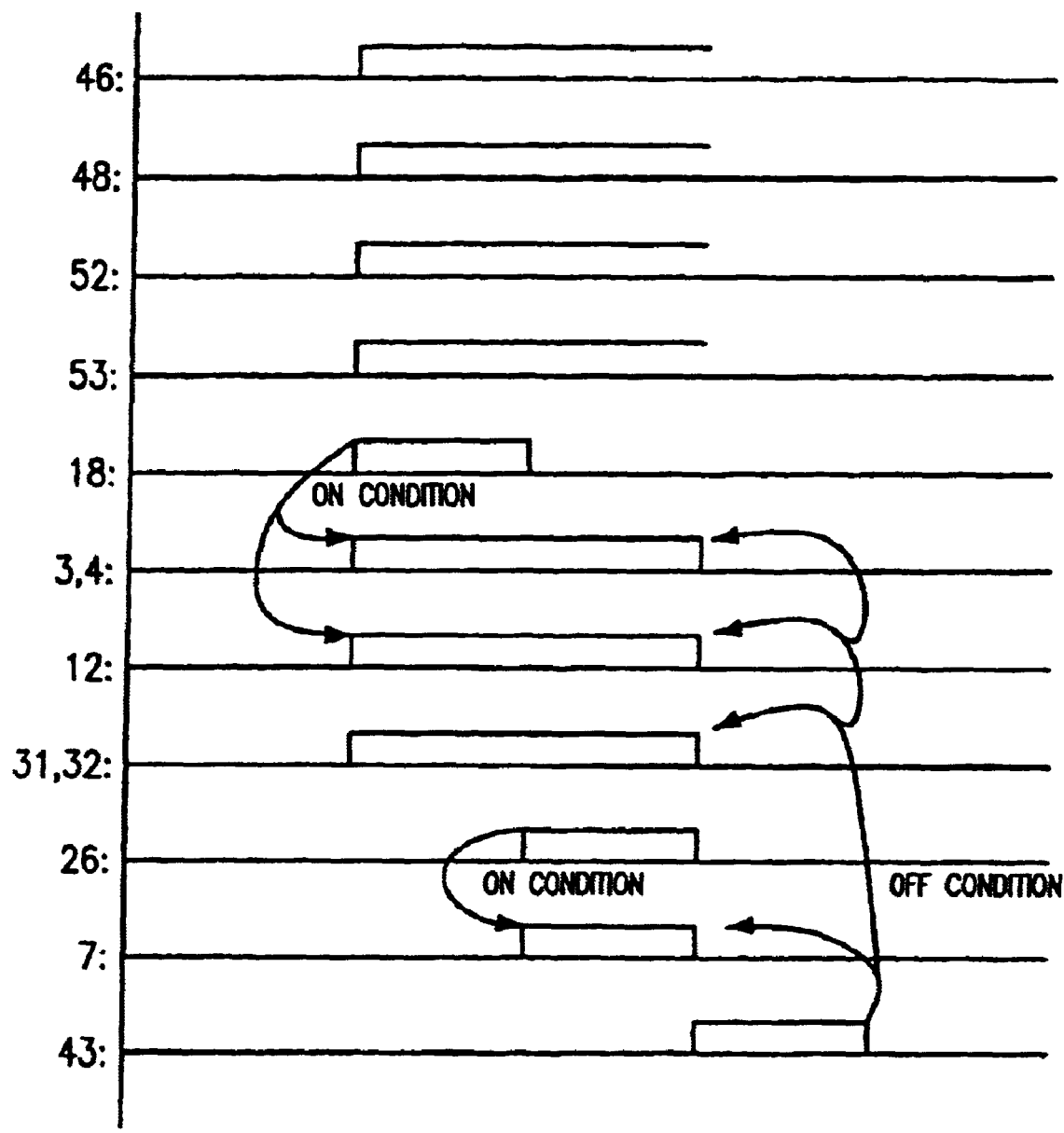
FIG. 6B is a timing diagram illustrating the operating sequence of the system-on routine of FIG. 6A.

As shown in FIGS. 6A and 6B, according to the webbing throwing-in routine S210 it is judged whether hardware such as a tongue, a guide ring and a ring mount is provided on the part mounting portions such as first and second part supplying portions and the webbing folding portion that an end mount is provided thereto and upper and lower stoppers are provided on a stopper supplying portion, whereby sensors 46 and 47 for detecting the movement of each of the first and second part supplying portions, a first tongue sensor 52, a first anchor sensor 58 and upper and lower stopper sensors 78' and 78 are scanned through their outputs. Step S210 proceeds onto step S220 to judge whether the hardware to be assembled into the seatbelt retractor is provided on the part mounting portions by scanning the outputs of the sensors 46, 48, 52, 58, 78, 78', if the lamps for indicating the mounting of the hardware (called "Hardware indicating lamp" below) are turned off at step S221. If the hardware indicating lamps are turned on at step S221, step S221 goes on step S230 to allow a user to throw the webbing into the webbing-throwing portion. Next, as the first webbing sensor 18 is operated, if the proper throwing of the webbing identified at step S240, a cylinder 3, an actuator 4 and a first thrust and first and second webbing position determining devices 31 and 32 provided with a solenoid valve are operated through steps S250, S252 and S253. If the webbing is not thrown-in, it is judged at step S241 to identify the existence of the webbing in the system by the first webbing sensor 18. If the solenoid valve output of the second webbing position determining device 32 is identified for the purpose of guiding the webbing, the webbing throwing-in step motor 7 is operated at step S254. Thereafter, as the webbing arrives at a boxed case 37, the second webbing sensor 43 detects the arrival of the webbing at step S260. At that time, the cylinder 3, the actuator 4, the first thrust 12, the second webbing position determining device 32 and the step motor 7 are stopped at step S270. Next, the webbing withdrawing routine S300 begins.

On the other hand, as illustrated in a timing sequence of the parts of FIG. 6B, the first and second part supplying sensors 46 and 47, the first tongue sensor 52 and the first anchor sensor 58 keeps their detecting operation from the beginning point of the webbing throwing-in. After several seconds taken for the webbing passing, the webbing detecting is stopped. In other words, during the webbing detecting of the first webbing sensor 18 at the on state, the cylinder 4, the actuator 3 and the second webbing position determining device 32 are operated. Under the condition that the piston sensor 26 is turned on, the step motor 7 to throw the webbing is operated. And, under the condition that the second sensor 43 is turned on to detect the webbing, the cylinder 4, the step motor 7, the first thrust 12 and the second webbing position determining device 32 for guiding the webbing stops.

Figure 7A:
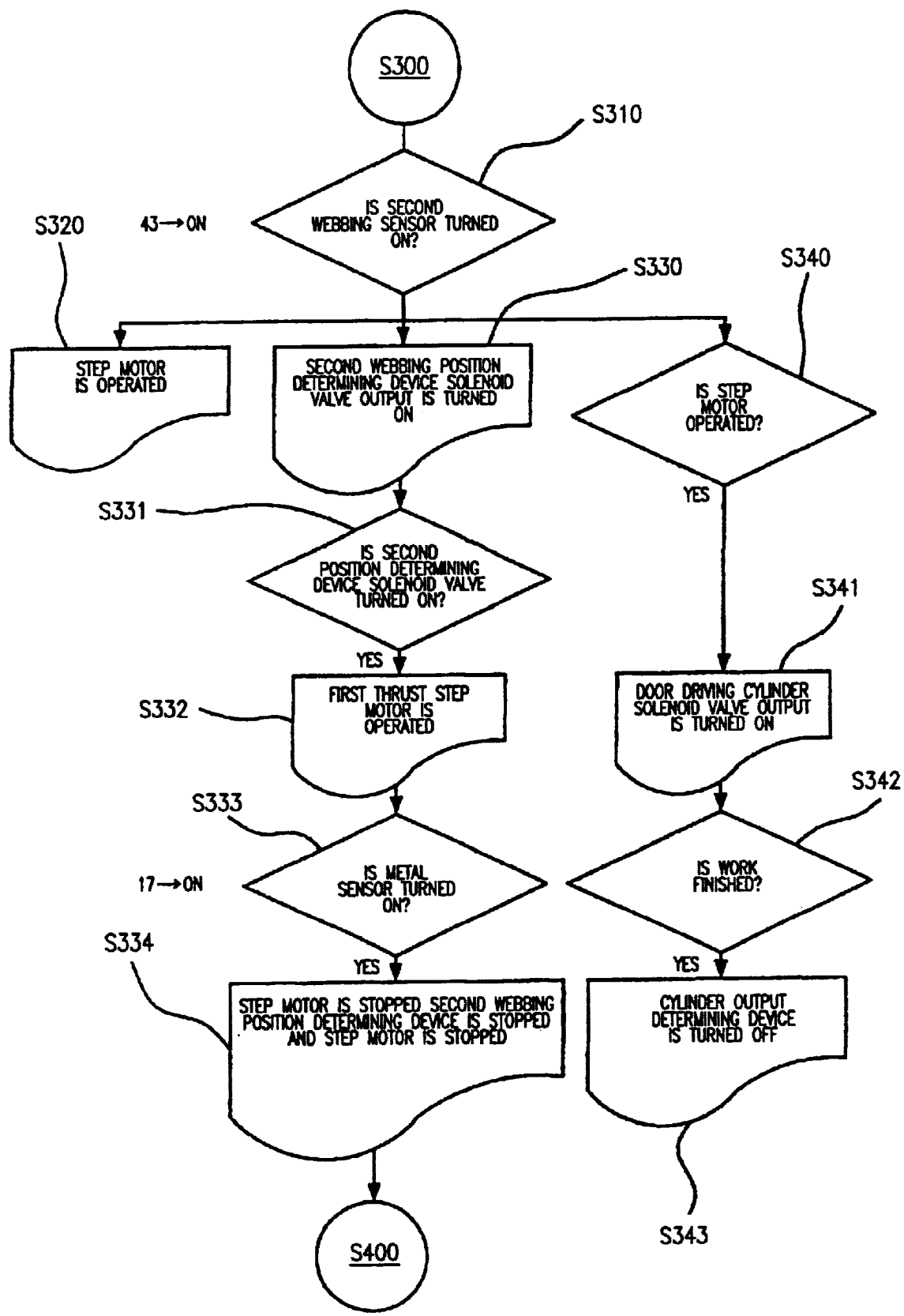
FIG. 7A is a flow chart illustrating a webbing throwing-in routine of FIG. 4.
Figure 7B:
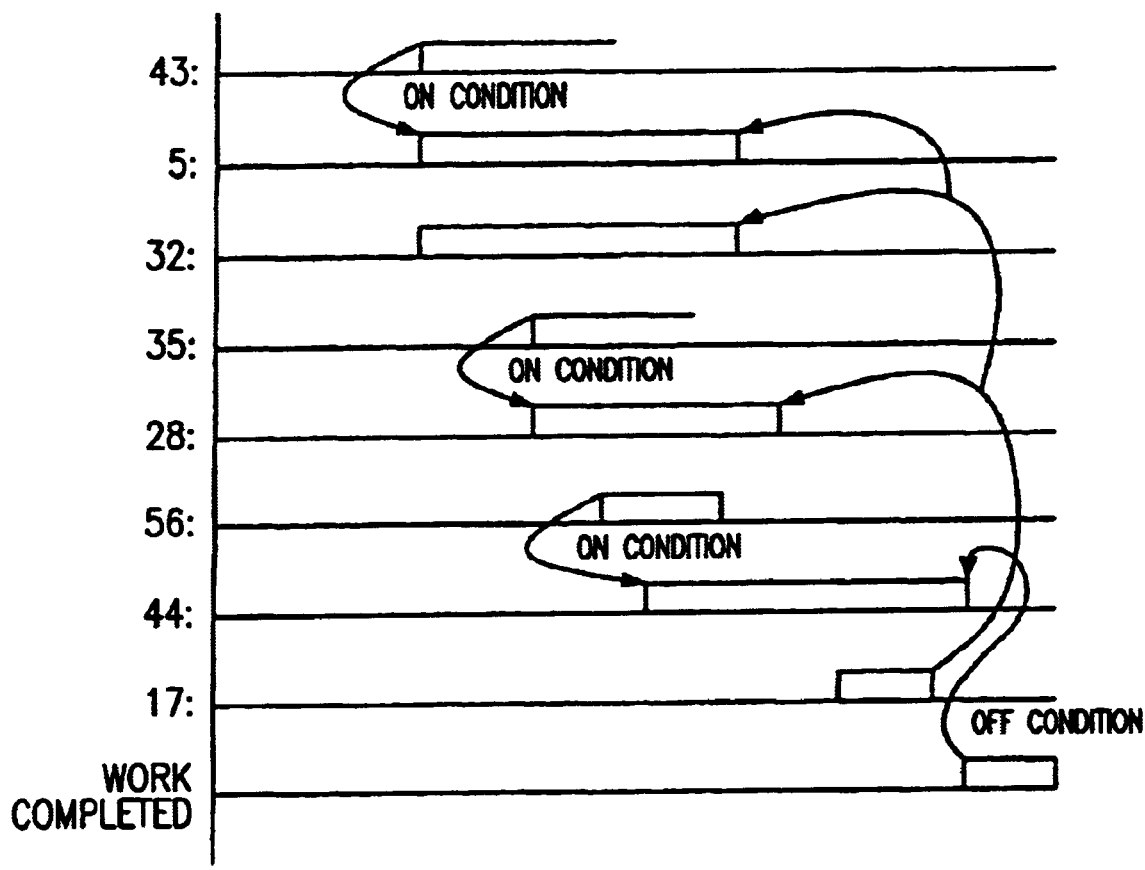
FIG. 7B is a timing diagram illustrating the operating sequence of the webbing throwing-in routine of FIG. 7A.

As shown in FIGS. 7A and 7B, according to the webbing withdrawing routine S300, when the second webbing sensor 43 is turned on at step S310, the step motor 5 and the second webbing position determining device 32 are operated at steps S320 and S330. At that time, the PLC scans the solenoid valve output of the second webbing position determining device 32 at step S331. If the solenoid valve output of the second webbing position determining device 32 is identified, step S331 goes onto step S332 to operate the step motor 28. If the metal sensor 17 detects the metal fixing pin coupled with the distal end of the webbing at step S333, step S333 proceeds onto step S334 so that the step motor 5 laying down the webbing by a bar 6 shafted thereto, the second webbing position determining device 32 and the step motor 28 rotating the roller 29 to supply the webbing to the case 37 are turned off. At the same time, at step S340, the third thrust 57 is operated during the webbing detecting of the second webbing sensor 43. Thereafter, a cylinder 44 is operated to open a door 41 at step S341. As the work for withdrawing the webbing is finished at step S342, the cylinder 44 provided with the solenoid valve is stopped at step S342. Thereafter, the webbing carrying routine 400 begins.

On the other hand, as illustrated in the operating timing diagram of FIG. 7B, the second webbing sensor 43 generates the output signal at the time of detecting the webbing and then stops the detecting of the webbing after several seconds taken for passing through it. Under the condition that the second webbing sensor 43 is turned on, the step motor 5, the second thrusts 35 provided with the solenoid valve begin to operate. When the metal sensor 7 is turned off, they stop. Especially, the step motor 28 to supply the webbing is operated, when the solenoid valve of the second webbing position determining device 32 is scanned while the sensor 38 for identifying the advancement of the second thrust 35 is turned on. Then, when the metal sensor 17 is turned off, the second webbing position determining device 32 stops. And, the cylinder 44 is operated after several seconds that the PLC operates the step motor, to which a roller 56 is shafted. When the webbing carrying is finished, the cylinder 44 stops.

Figure 8A:
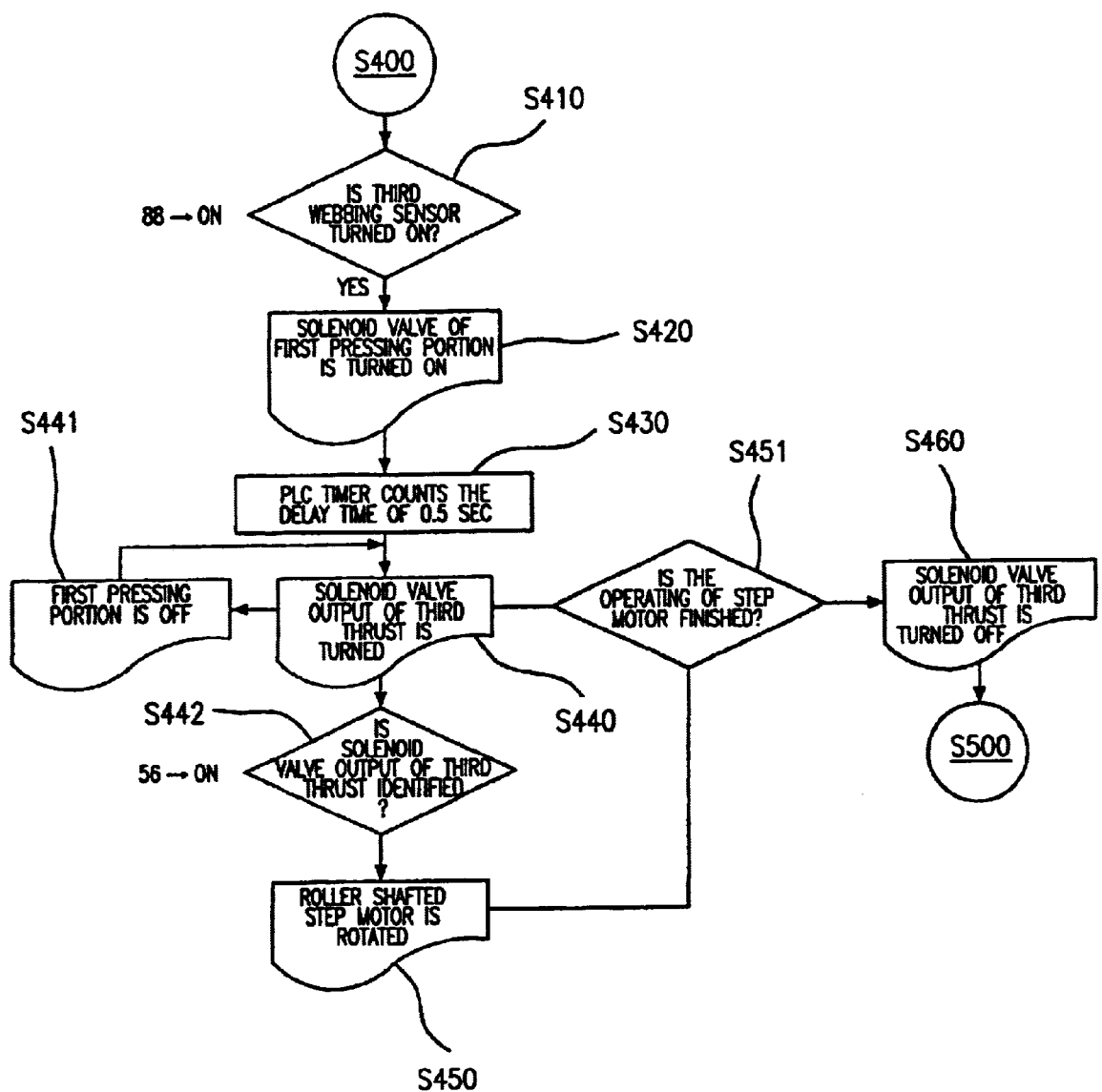
FIG. 8A is a flow chart illustrating a webbing carrying routine of FIG. 4.
Figure 8B:
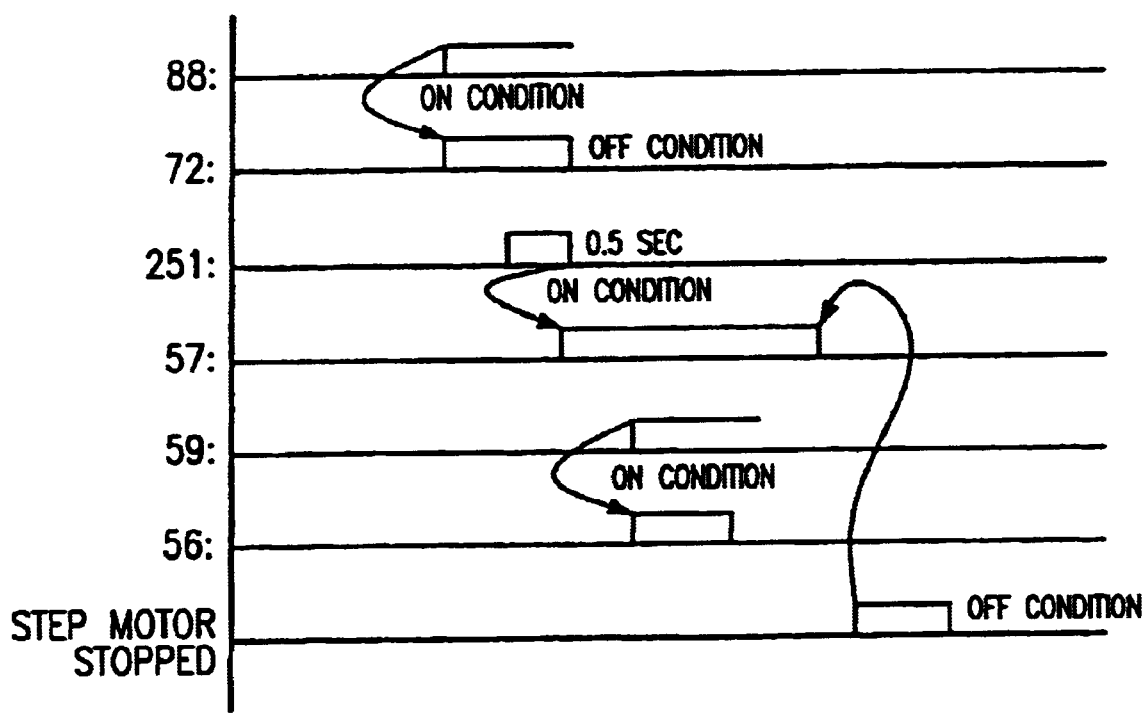
FIG. 8B is a timing diagram illustrating the operating sequence of the webbing carrying routine of FIG. 8A.

As shown in FIGS. 8A and 8B, according to the webbing carrying routine S400 for supplying the webbing all over the system, when the third sensor 88 is turned on at step S410, the solenoid valve output of a first pressing portion 72 is generated, and then the PLC timer 252 counts the delay time of 0.5 sec at step 430. Thereafter, the third thrust 57 provided with a solenoid valve is operated at step S430. At that time, the first pressing portion 72 is turned off. If a third thrust sensor 59 identifies the solenoid valve of the third thrust 57 at step S441, a roller 56 shafted to a step motor is intermittently rotated at step S450. Next, step S450 proceeds onto step 451 to stop the roller step motor. The solenoid valve output of the third thrust 57 is suspended at step S460. Next, the upper and lower stopper supplying routine S500 begins.

On the other hand, as illustrated in the timing diagram of FIG. 8B, the third webbing sensor 88 is kept at the webbing detecting state from the webbing carrying time point, and then stops the detecting of the webbing after several seconds taken for passing through it. Under the condition that the third webbing sensor 88 is turned on, the first pressing portion 72 is operated and then stops after the delay time of 0.5 sec by the PLC timer 251. After the delay time 0.5 sec of the PLC timer 251, the third thrust 57 is operated with the operating control signal being applied to its solenoid valve. At the time that the step motor of the roller 56 stops, the solenoid valve output of the third thrust 57 is turned off. Of course, the step motor begins to operate at when the third thrust sensor 59 detects the advancement of the cylinder of the third thrust 57.

Figure 9A:
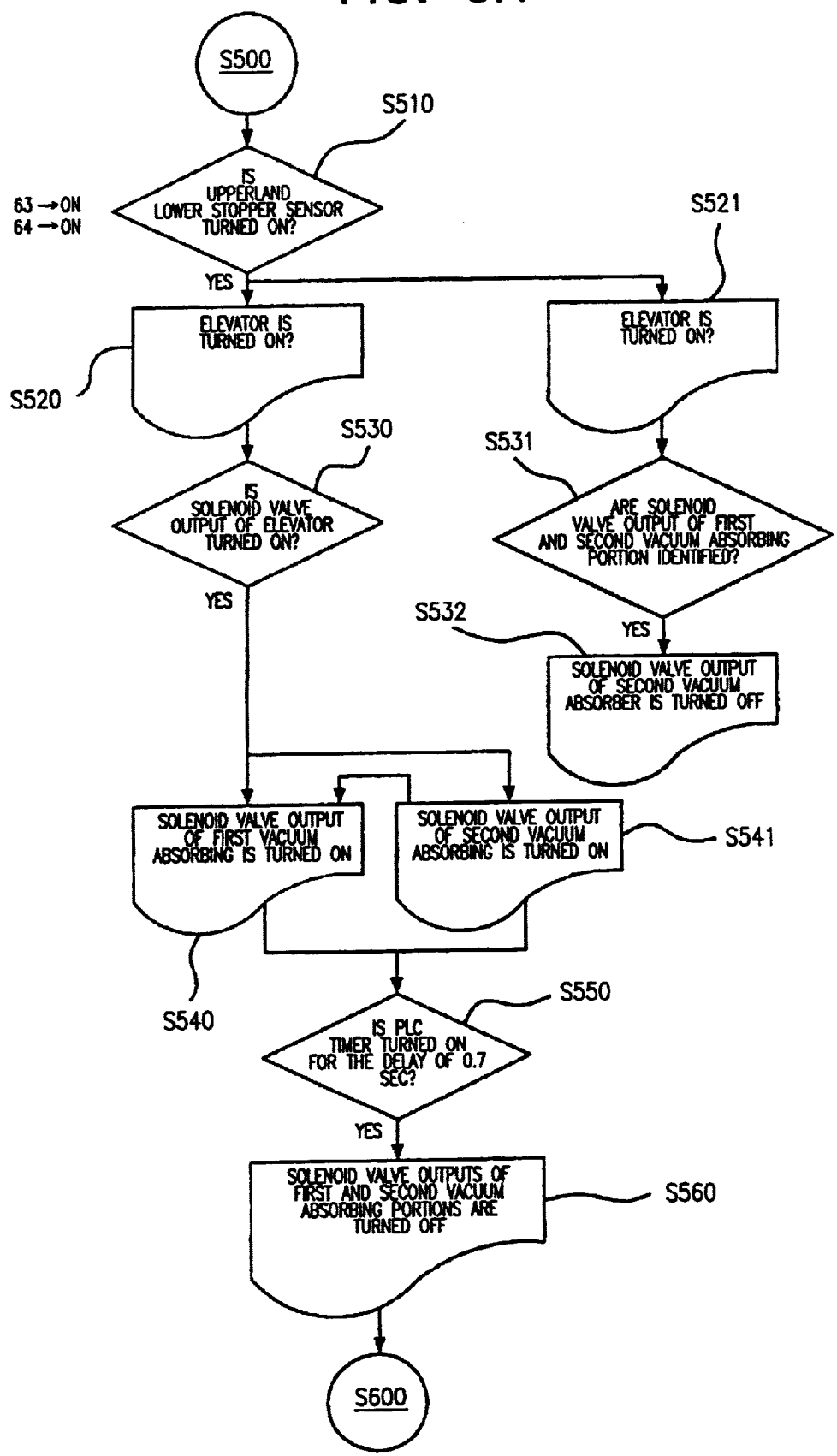
FIG. 9A is a flow chart illustrating a stopper supplying routine of FIG. 4.
Figure 9B:
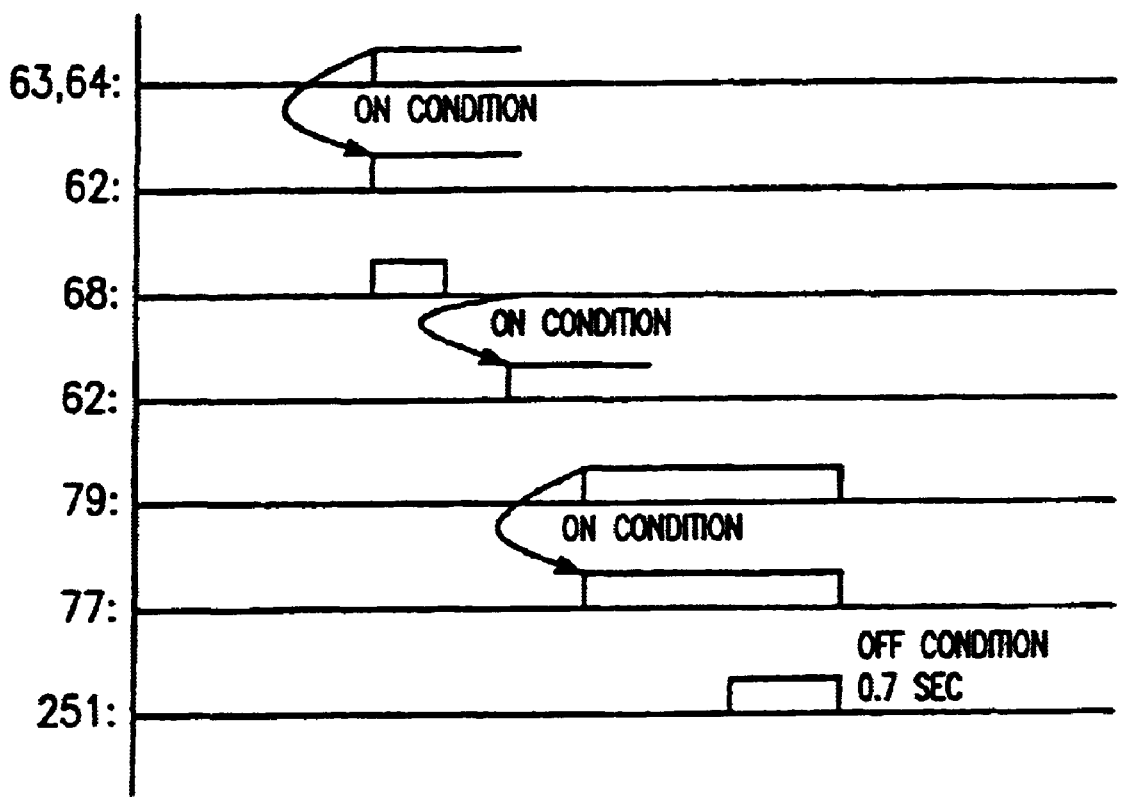
FIG. 9B is a timing diagram illustrating the operating sequence of the stopper supplying routine of FIG. 9A.

As shown in FIGS. 9A and 9B, according to the upper and lower stopper supplying routine S500, if upper and lower stopper sensors 63 and 64 are turned on at step S510, the solenoid valve output of an elevator 62 is turned on to operate the elevator 62 through the output of its solenoid valve to carry the upper and lower stoppers upward at step S520. Next, in order to horizontally arrange the upper and lower stoppers with both surfaces of the webbing in an upstanding state, a vacuum absorber 68 is operated to maintain the vacuum state of a pressing area with its solenoid valve output being turned on at step S521. Thereafter, it is judged at step S521 whether the solenoid vale output of the elevator 62 is turned on. At the same time, it is judged at step S531 whether first and second absorbing portions 77 and 79 are operated with its solenoid valve output being turned on. If so, the solenoid valve output of the vacuum absorber 68 is turned off at step S532. And, it is judged at step S530 whether the solenoid valve output of the elevator 62 is being turned on. If so, the first and second absorbing portions 77 and 79 are operated through steps S540 and S541. Thereafter, due to that the PLC timer 251 is operated at step S550, after the delay time of 0.7 sec the solenoid valve outputs of the first and second absorbing portions 77 and 79 are turned of. Next, the upper and lower stopper fixing routine S600 begins.

On the other hand, as illustrated in the operating timing diagram of FIG. 9B, the operating time points of the elevator 62 and the vacuum absorber 68 are determined by whether the upper and lower stopper sensors 63 and 64 are turned on to detect the upper and lower stoppers. Also, under the condition that the solenoid valve output of the elevator 62 is turned on, the first and second absorbing portions 77 and 79 begins to be operated and then stopped after the elapse of the delay time 0.7 sec by the PLC timer 251.

Figure 10A:
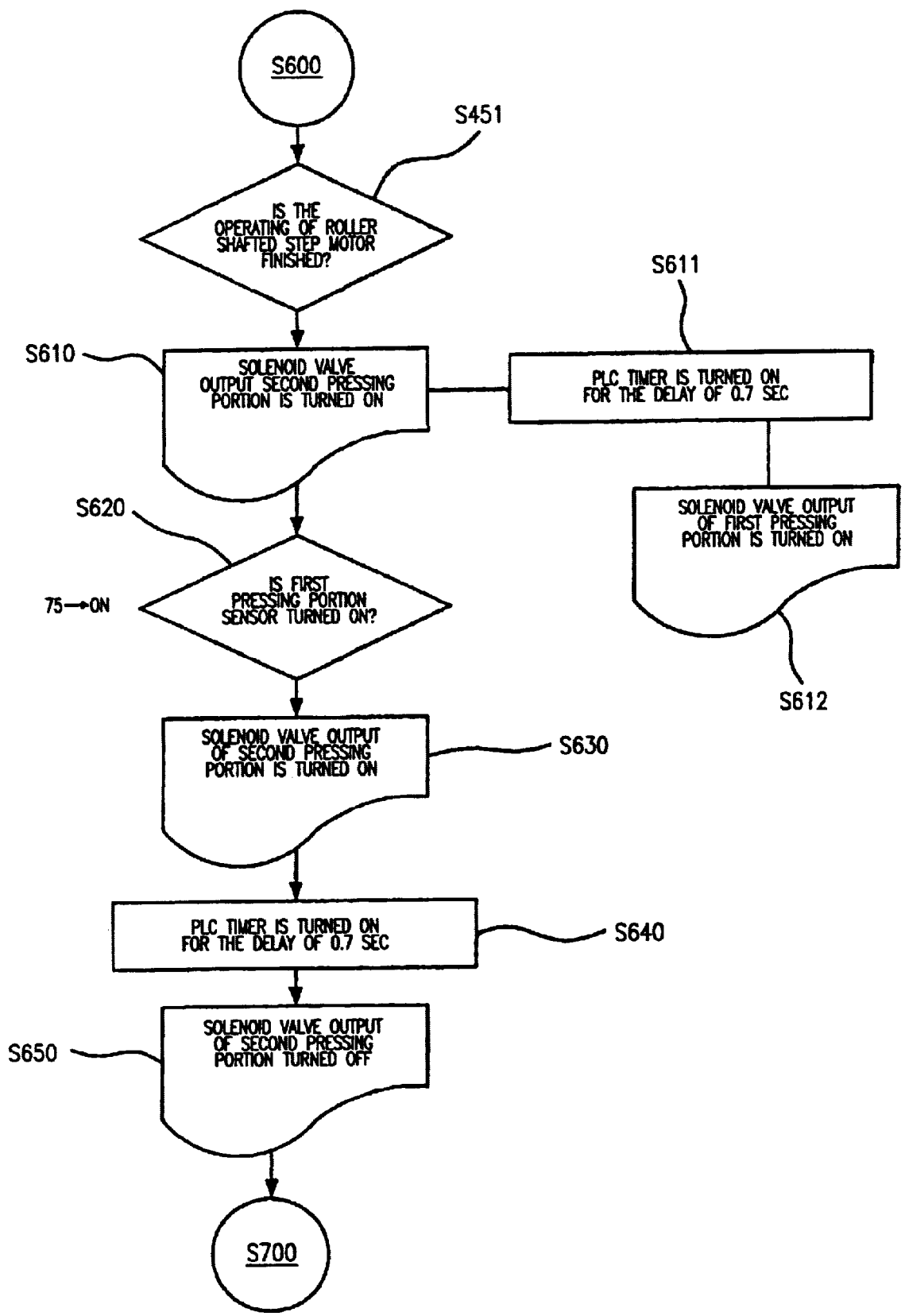
FIG. 10A is a flow chart illustrating a stopper fixing routine of FIG. 4.
Figure 10B:
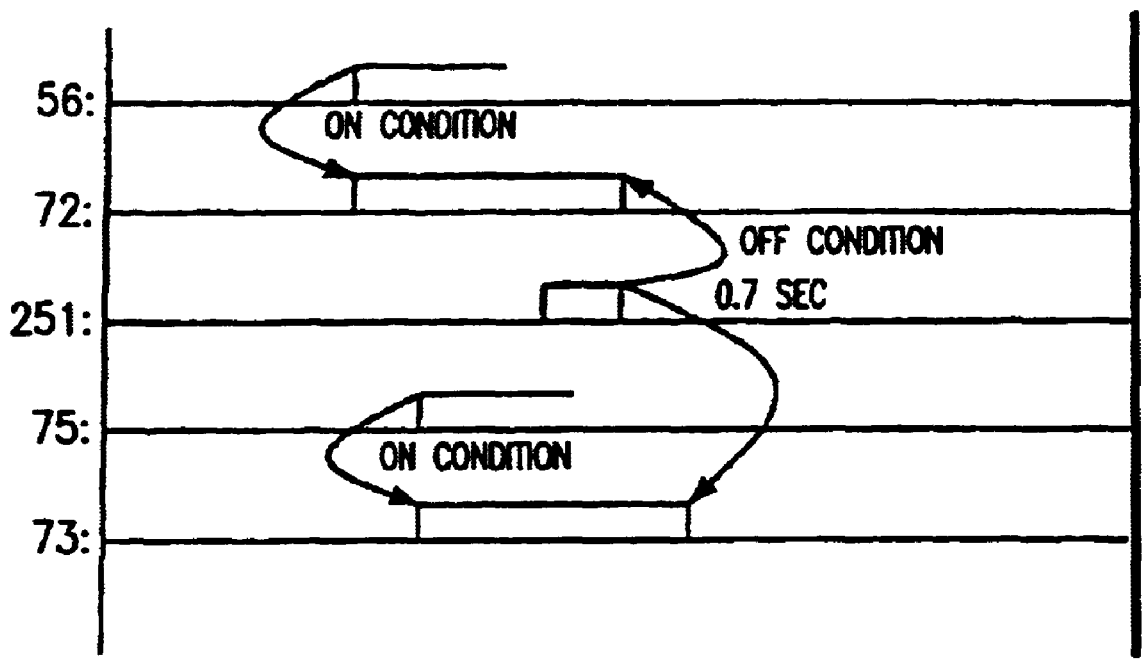
FIG. 10B is a timing diagram illustrating the operating sequence of the stopper fixing routine of FIG. 10A.

As shown in FIGS. 10A and 10B, according to the upper and lower stopper fixing routine S600, it is judged at step S451 (referring to FIG. 8A) whether a step motor shafted to a roller 56 ends its operating. If so, the fist-pressing portion 72 is operated at step 610. The first pressing portion 72 stops after the elapse of the delay time 0.7 sec caused by the operating of the PLC timer 251 through steps S611 and S612. And, it is judged at step S620 whether a first pressing portion sensor 73 is turned on. If so, the solenoid valve output of a second pressing portion is turned on at step S630. And, the second pressing portion stops with its solenoid valve output being turned off after the elapse of the delay time 0.7 sec caused by the PLC timer 251. Next, the webbing folding routine S700 begins.

In other words, as illustrated in the timing diagram of FIG. 10B, the first pressing portion 72 begins to operate, when a signal representing the driving completion of the step motor having the roller 56 is generated, and then stops when the PLC timer 251 is turned off. Also, also, the second pressing portion begins to operate, when the first pressing portion sensor 75 is turned on, and stops when the PLC timer 251 is turned off.

Figure 11B:
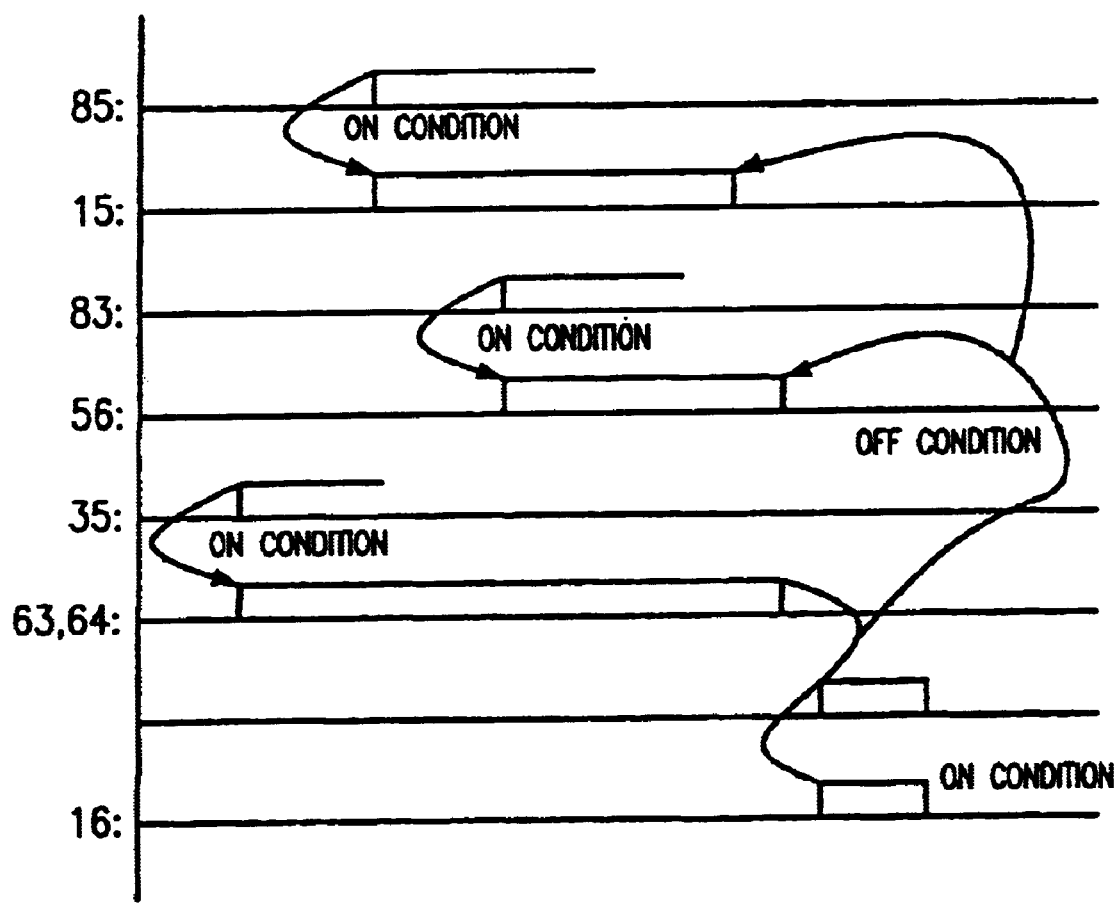
FIG. 11B is a timing diagram illustrating the operating sequence of the folding routine of FIG. 11A.

As shown in FIGS. 11A and 11B, according to the webbing folding routine S700, when a fourth webbing sensor 95 detects the webbing carrying at step S710, a fourth thrust 83 is operated with its solenoid valve output being turned off at step S720. It is judged at step S730 whether the solenoid valve output of the fourth thrust 83 is identified by a fourth thrust advancement sensor 85. If so, a step motor, to which a roller 82 is shafted, is operated to fold the webbing at step S730.

Especially, referring to FIG. 11B, the fourth thrust 83 is operated, when the fourth webbing sensor 95 is turned on, and stops, when a fifth webbing sensor 97 is turned off. Similarly, the step motor of the roller 82 and a carrying block 92 are operated when a fourth thrust backward sensor 86 and the first webbing sensor 18 are turned on, and stops, when a fifth webbing sensor 97 is turned off.

In other words, if the first webbing sensor 18 again detects another webbing to be assembled at step S711. The solenoid valve output of the carrying block 92 is turned on at step S721. And, if the fifth webbing sensor 97 detects the distal end of the webbing to be exited from the system at step S731, the carrying block 92 and the step motor of the roller 82 stop at step S741. At the same time, the fifth thrust 83 is operated to return the roller 82 to the original position at step S742. Therefore, one cycle for assembling the seatbelt retractor is terminated.

Acting Effectiveness of the Invention

As described above, a control system of a facility automation facility for a seatbelt retractor assembly comprises a control portion including at least one PLC in addition to a plurality of sensors and solenoid valves and a plurality of devices and cylinders connected thereto, thereby enabling the mass-production of the seatbelt retractor assembly in a short time, effectively, with a relatively little labour.

A control method of a facility automation facility for a seatbelt retractor assembly performs a series of assembly procedures based on the on or off condition of each portions and parts according to the control of the control portion including at least one PLC that a system programming is previously made therein, thereby performing the exact assembly work with a relatively less system operating error.

What is claimed is:

1. a control system of a factory automation facility for a seatbelt retractor assembly comprising a factory automation facility and a control portion for controlling the operating of all parts in the factory automation facility, integrally, to enable the mass-production of a seatbelt retractor assembly, in which the factory automation facility comprises a webbing throwing-in portion for throwing-in a webbing of a strip type thereinto by a first webbing supplying portion; first and second webbing position determining devices for guiding the webbing to pass through the hole of a retractor spool, a webbing withdrawing portion including a second webbing supplying portion and a case to withdraw the webbing and store it for a while, first and second part supplying portions for assembling a tongue, a guide ring and a ring mount on the withdrawn webbing, a stopper fixing portion including a third webbing supplying portion for carrying the webbing to a webbing folding portion, upper and lower stopper suppliers for supplying upper and lower to be mounted on both surfaces of the webbing, respectively, and a stopper pressing portions for coupling the upper and lower stopper parts with each other on the other side of the webbing; and a webbing folding portion for folding the front end of the webbing by the reference of its centre in a longitudinal direction and coupling the folded end to an end mount.

2. The control system as claimed in claim 1, in which:
the webbing throwing-in portion 10 comprises a case 1 in which triangle blocks are mounted to form a clearance there between for guiding/supporting the webbing at an upstanding state; an actuator and a cylinder mounted on the lower portion of the case to move the case with the webbing in a longitudinal direction, a step motor and a rotating bar shafted thereto mounted on one side of the case to rotate the rotating bar by a $90^0$ in order to lay down the webbing, horizontally, and prevent its twisting to be supplied, a first webbing supplying portion including a step motor and a first roller shafted thereto and a second roller connected to a first thrust facing against each another mounted on the front end of the case, a first guide including two guide plates in the form of a venturi which is mounted adjacent to the rollers of the webbing supplying portion and a retractor fixing portion formed on the rear end of the first guide to position a retractor thereon and direct a hole formed on its spool to the first guide.

3. The control system as claimed in claim 1, in which:
first and second webbing position determining devices constituted as a hydraulic cylinder mounted adjacent to the retractor fixing portion comprises a first webbing position determining device including a metal holder fixed to a piston therein and initial and advancement position sensors for determining the position movement of its piston to restrict the rotation of the retractor and guide the webbing into the hole of the spool and a second webbing position determining device including a metal holder fixed to a piston therein and initial and advancement position sensors for determining the position movement of its piston in order to prevent the rotation of the retractor by the movement of the metal holder, withdraw the webbing from the spool hole of the retractor and supply it to the webbing withdrawing portion.

4. The control system as claimed in claim 1, in which:
the webbing withdrawing portion comprises a second webbing supplying portion including a second webbing guide that two guide plates are formed like a venturi, a third roller shafted to a step motor and a fourth roller connected to a second solenoid valve to be moved forward and rearward facing to the third roller; and a case mounted adjacent to the second webbing supplying portion to store the webbing therein for a while.

5. The control system as claimed in claim 1, in which:
the first and second part supplying portions are a block which includes two slits or guide grooves passing through the webbing and receiving portions formed by the reference of the guide groove to receive a guide ring, a ring mount and a tongue, respectively, so that the webbing is moved through the guide groove and the coupling hole of the parts.

6. The control system as claimed in claim 1, in which:
the stopper fixing portion comprises a third webbing supplying portion including a fifth roller shafted to a step motor to carry the webbing passed through the first part supplying portion to next stage and a sixth roller connected to a third solenoid valve to be moved forward and backward facing to the fifth roller 56; first and second pressing portions for coupling upper and lower stoppers to be positioned on the other side of the webbing to each other and fixing them to the webbing and stopper suppliers for arranging the upper and lower stoppers and automatically supplying them to a stopper fixing portion.

7. The control system as claimed in claim 1, in which:
the stopper fixing portion further comprises the first and second pressing portions and against each other to permit the webbing to be passed therebetween, in which the first pressing portion includes an actuator for enabling a pressing tool fixed to the end of a piston to be expanded and contracted, forward and backward movement sensors for the operating control of the actuator and a first absorbing portion for forming the inner portion thereof at a vacuum state by the vacuum absorber to position the upper stopper therein and provided with a sensor to identify the fixing of the upper stopper; and the second pressing portion includes a second absorbing portion for forming the inner portion thereof at a vacuum state by the vacuum absorber to position the lower stopper therein and provided with a sensor to identify the fixing of the lower stopper and a pushing cylinder moved forward and backward to push the lower stopper into the absorbing portion.

8. The control system as claimed in claim 1, in which:
the webbing folding portion comprises a fourth webbing supplying portion including a seventh roller shafted to a step motor to carry the webbing passed through the stopper fixing portion to next stage in order to couple an anchor to the webbing, a last part to be assembled, and an eighth roller connected to a fourth thrust to be moved forward and backward facing to the seventh roller; and a fixing unit for folding the end portion of the webbing to be inserted into the relative smaller hole of the anchor.

9. The control system as claimed in claim 1, in which:
the control portion comprises an inputting portion for processing signals from various sensors properly arranged on the factory automation facility, a power source supply for supplying at least one different power sources to a PLC, the PLC for controlling the operating of all portions in the factory automation facility, integrally, first and second microprocessor circuits connected through an interface to the PLC for controlling the operating of various parts in the factory automation facility and an outputting portion for applying control signals from the PLC to a load driving portion including rotating motors, stepping motors, a folding motor, various flexible cylinders using a hydraulic pressure, various solenoid valves and various lamps, in which;
the PLC further includes a step motor driving portion, a noise filter, a memory provided with a ROM for storing a system program for assembling a seatbelt retractor therein and the first and second microprocessor circuits, to which are electrically connected, the first microprocessor circuit includes a PLC timer for storing a plurality of delay times and part operating timings in a data register thereof and generating the conditional signals for the control based on the operating sequence of the system; a first PLC input microprocessor for processing the control signals from the PLC, a solenoid valve microprocessor for controlling the operating of a plurality of solenoid valves, a lamp and first sensor microprocessor for controlling the operating of a plurality of lamps and processing the signal from a first sensor and a relay microprocessor for controlling the operating of a plurality of relays in order to perform the control algorithms as described below; the second microprocessor circuit includes a second PLC input microprocessor for processing the input signals from the PLC, an output microprocessor for controlling the operating of the outputting portion and a second sensor microprocessor for processing the signals from the second sensor in order to perform the control algorithms along with the first microprocessor circuit.

10. A control method of a factory automation facility for a seatbelt retractor assembly comprising routines of:

turning on the power of a system to force the portions of the factory automation facility to be ready for their operating at a system-on routine;

throwing-in a webbing into a retractor at a webbing throwing-in routine;

withdrawing the webbing from the retractor at a webbing withdrawing routine;

carrying the webbing to a proper position so as to press upper and lower stoppers on the webbing at a webbing supplying routine;

pressing the upper and lower stoppers to be arranged on the other side of the webbing at a stopper fixing routine; and, pressing the upper and lower stoppers to be coupled to each other and folding the front end of the webbing to be coupled with an end mount at a folding routine.

11. The control method as claimed in claim 10, in which:
the system-on routine comprises steps of arranging cylinders, solenoid valves, motors, lamps on their original position by the control portion, when the power switch is turned on to operate the factory automation facility for the seatbelt retractor assembly; enabling the setting of the basic values of the parts for assembling the seatbelt retractor by a user, operating upper and lower stopper sensors, judging whether the supplying of upper and lower stoppers to the positions for a pressing procedure is being supplied and performing the output on/off operating of each parts representing the good condition of the portions to be controlled for a ready state prior to the assembly operating.

12. The control method as claimed in claim 10, in which:
the webbing throwing-in routine comprising steps of judging whether a tongue, a guide ring and a ring mount are provided on the first and second part supplying portions, an end mount is provided on the webbing folding portion, and upper and lower stoppers are provided on a stopper supplying portion, whereby sensors for detecting the movement of each of the first and second part supplying portions, a first tongue sensor, a first anchor sensor and upper and lower stopper sensors are scanned through their outputs; judging whether the parts to be assembled into the seatbelt retractor is provided on the part assembling portions by scanning the outputs of the sensors, if the indicating lamps are turned off; operating the cylinder, the actuator and the first and second webbing position determining devices related to the sensors, if the hardware indicating lamps are turned on and the webbing throwing-in is detected; judging whether the first webbing sensor detects the webbing throwing-in, if the webbing is not thrown-in; operating the step motor to throw in the webbing, if the solenoid valve output of the second webbing position determining device is identified; and, stopping the operating of the cylinder, the actuator, the first thrust, the second webbing position determining device and the step motor, if the second webbing sensor 43 detects the arrival of the webbing, when the webbing arrives at a boxed case.

13. The control method as claimed in claim 10, in which:
the webbing withdrawing routine further comprises steps of maintaining the detecting state of the first and second part supplying portion sensors, the first tongue sensor, the first anchor sensor and the upper and lower stopper sensors from the beginning time point of the webbing throwing-in; operating the cylinder, the actuator and the second webbing position determining device, if the webbing throwing-in is detected; and stopping the operating of the cylinder, the actuator and the second webbing position determining device, if the webbing detecting fails after several seconds taken for the passing of the webbing.

14. The control method as claimed in claim 10, in which:
the webbing withdrawing routine further comprises steps of operating the step motor and the second webbing position determining device, when the second webbing sensor is turned on; operating the step motor of the webbing withdrawing portion when the solenoid valve output of the second webbing position determining device; turning off the step motor laying down the webbing by their bar, the second webbing position determining device and the step motor, if the metal sensor detects the metal fixing pin coupled with the distal end of the webbing; operating the third thrust; operating a cylinder to open a door; and stopping the operating of the cylinder if the webbing withdrawing is finished.

15. The control method as claimed in claim 10, in which:
the webbing carrying routine for carrying the webbing in a longitudinal direction comprises steps of operating the step motor and a third thrust, when a third webbing sensor is turned on to generate its output, and stopping the operating of the step motor and the third thrust, when the metal sensor is turned off after several seconds taken for the passing of the webbing.

16. The control method as claimed in claim 10, in which:
The webbing carrying routine further comprises steps of operating a first pressing portion, when the third webbing sensor detects the webbing; operating the third thrust and stopping the operating of the first pressing portion, after the PLC timer counts the delay time 0.5 sec of the PLC timer; and stopping the operating of the step motor and the third thrust at the same time after the intermittent operating of the step motor, when the third thrust sensor is turned on.

17. The control method as claimed in claim 10, in which:
the upper and lower stopper supplying routine comprises steps of operating an elevator to carry upper and lower stoppers upward, when upper and lower stopper sensors are turned on; operating a vacuum absorber to maintain the vacuum state of a stopper pressing area and horizontally arrange the upper and lower stoppers with both surfaces of the webbing in an upstanding state; operating first and second absorbing portions, if the elevator is operated and then stopping the operating the vacuum absorber; and stopping first and second absorbing portions after the delay time 0.7 sec of the PLC timer.

18. The control method as claimed in claim 10, in which:
the upper and lower stopper fixing routine comprises steps of operating a first pressing portion, when a step motor of a third webbing supplying portion is stopped; stopping the operating of the first pressing portion after the elapse of the delay time 0.7 sec of the PLC timer; operating a second pressing portion when the first pressing portion sensor is turned on; and stops when the PLC timer is turned off.

19. The control method as claimed in claim 10, in which:

the webbing folding routine comprises steps of operating a fourth thrust, when a fourth webbing sensor detects the webbing carrying; operating a step motor of a fourth webbing supplying portion to fold the webbing, when a fourth thrust is turned on; operating the step motor and a carrying block, when a fourth thrust backward sensor and the first webbing sensor are turned on; stopping the operating of the step motor and the carrying block, when a fifth webbing sensor is turned off; and operating a fifth thrust to return the roller to the original position, thereby completing one cycle for assembling the seatbelt retractor.

* * * * *